United States Patent
Dowaki et al.

(10) Patent No.: US 9,869,774 B2
(45) Date of Patent: Jan. 16, 2018

(54) RADIATION IMAGING APPARATUS, DRIVING METHOD FOR THE SAME, AND NON-TRANSITORY COMPUTER-READABLE MEDIUM

(71) Applicant: CANON KABUSHIKI KAISHA, Tokyo (JP)

(72) Inventors: Kanako Dowaki, Tokyo (JP); Kazumasa Matsumoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/741,565

(22) Filed: Jun. 17, 2015

(65) Prior Publication Data
US 2015/0378034 A1     Dec. 31, 2015

(30) Foreign Application Priority Data
Jun. 25, 2014  (JP) ................................ 2014-130683

(51) Int. Cl.
| | | |
|---|---|---|
| G01T 1/20 | (2006.01) | |
| G01T 1/208 | (2006.01) | |
| H04N 5/361 | (2011.01) | |
| H04N 5/32 | (2006.01) | |

(52) U.S. Cl.
CPC ............ G01T 1/2018 (2013.01); G01T 1/208 (2013.01); H04N 5/32 (2013.01); H04N 5/361 (2013.01)

(58) Field of Classification Search
CPC ............................... G01T 1/2018; G01T 1/208
See application file for complete search history.

(56) References Cited

U.S. PATENT DOCUMENTS

| | | | |
|---|---|---|---|
| 6,362,482 B1 * | 3/2002 | Stettner ................. | G01T 1/1644 250/370.01 |
| 7,548,265 B2 | 6/2009 | Egashira et al. | |
| 2011/0228904 A1 | 9/2011 | Iwakiri et al. ................... | 378/62 |
| 2011/0317054 A1 | 12/2011 | Kameshima et al. ........ | 348/302 |

(Continued)

FOREIGN PATENT DOCUMENTS

| | | |
|---|---|---|
| CN | 102413766 | 4/2012 |
| CN | 102780857 | 11/2012 |

(Continued)

OTHER PUBLICATIONS

ESSR dated Nov. 4, 2015 in counterpart European Patent Application 15170193.5 (in English).

*Primary Examiner* — Edwin Gunberg
(74) *Attorney, Agent, or Firm* — Fitzpatrick, Cella, Harper & Scinto

(57) ABSTRACT

A radiation imaging apparatus, comprising a plurality of sensors and a driving unit, each sensor including a detection element, a sampling unit and a reset unit, wherein the driving unit performs an operation of causing the reset unit to initialize the detection element, an operation of causing the sampling unit to sample a signal from the detection element in accordance with radiation irradiation started after the operation of initializing, and an operation of outputting a signal sampled by the operation of sampling, and wherein the driving unit changes, in accordance with a frame rate, a timing of the operation of outputting while maintaining constant a time from the operation of initializing to the operation of sampling.

13 Claims, 13 Drawing Sheets

(56) References Cited

U.S. PATENT DOCUMENTS

| | | | |
|---|---|---|---|
| 2012/0087471 A1 | 4/2012 | Naito et al. | ..................... 378/62 |
| 2014/0036118 A1 | 2/2014 | Dowaki et al. | ...... G01N 5/2173 |
| 2014/0037056 A1 | 2/2014 | Naito et al. | ............ G01N 23/04 |
| 2015/0204988 A1 | 7/2015 | Dowaki | ..................... G01T 1/24 |
| 2015/0296151 A1 | 10/2015 | Dowaki et al. | ........ G01N 5/343 |

FOREIGN PATENT DOCUMENTS

| | | |
|---|---|---|
| EP | 2 424 437 | 10/2013 |
| JP | 2006-115413 | 4/2006 |
| JP | 2012-085124 | 4/2012 |
| JP | 2013-153857 | 8/2013 |

* cited by examiner

FIG. 7A
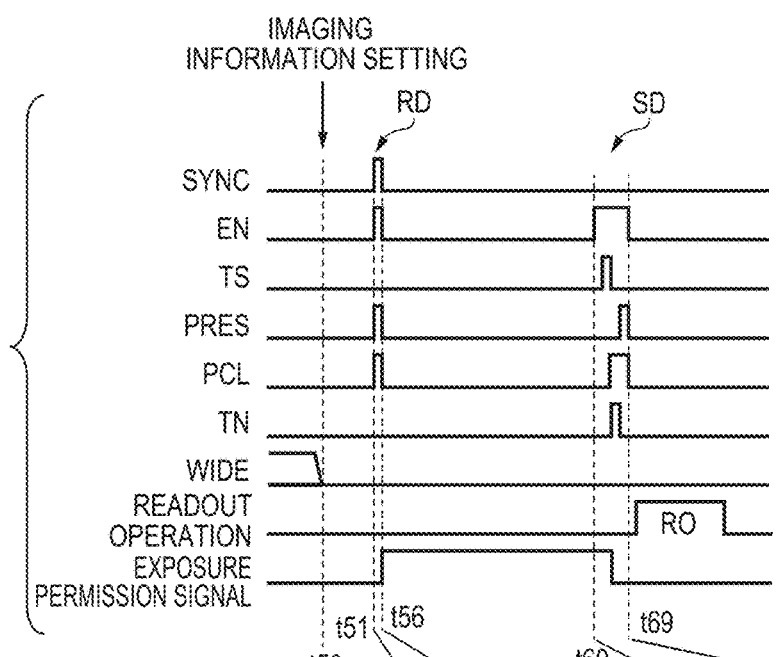
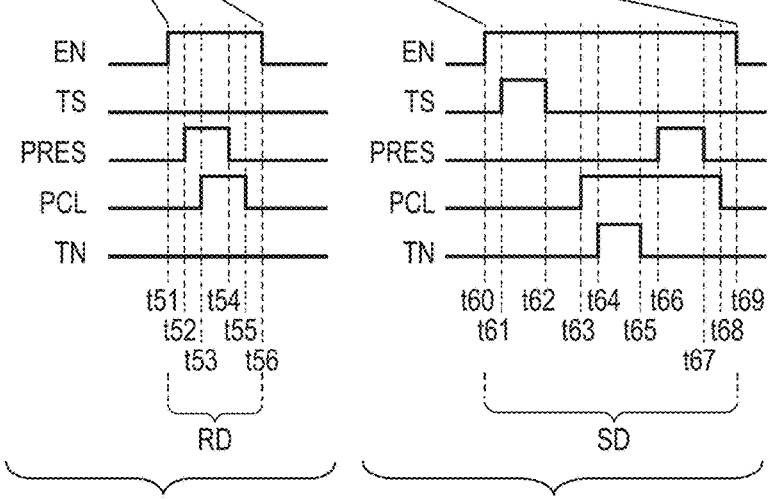
FIG. 7B  FIG. 7C

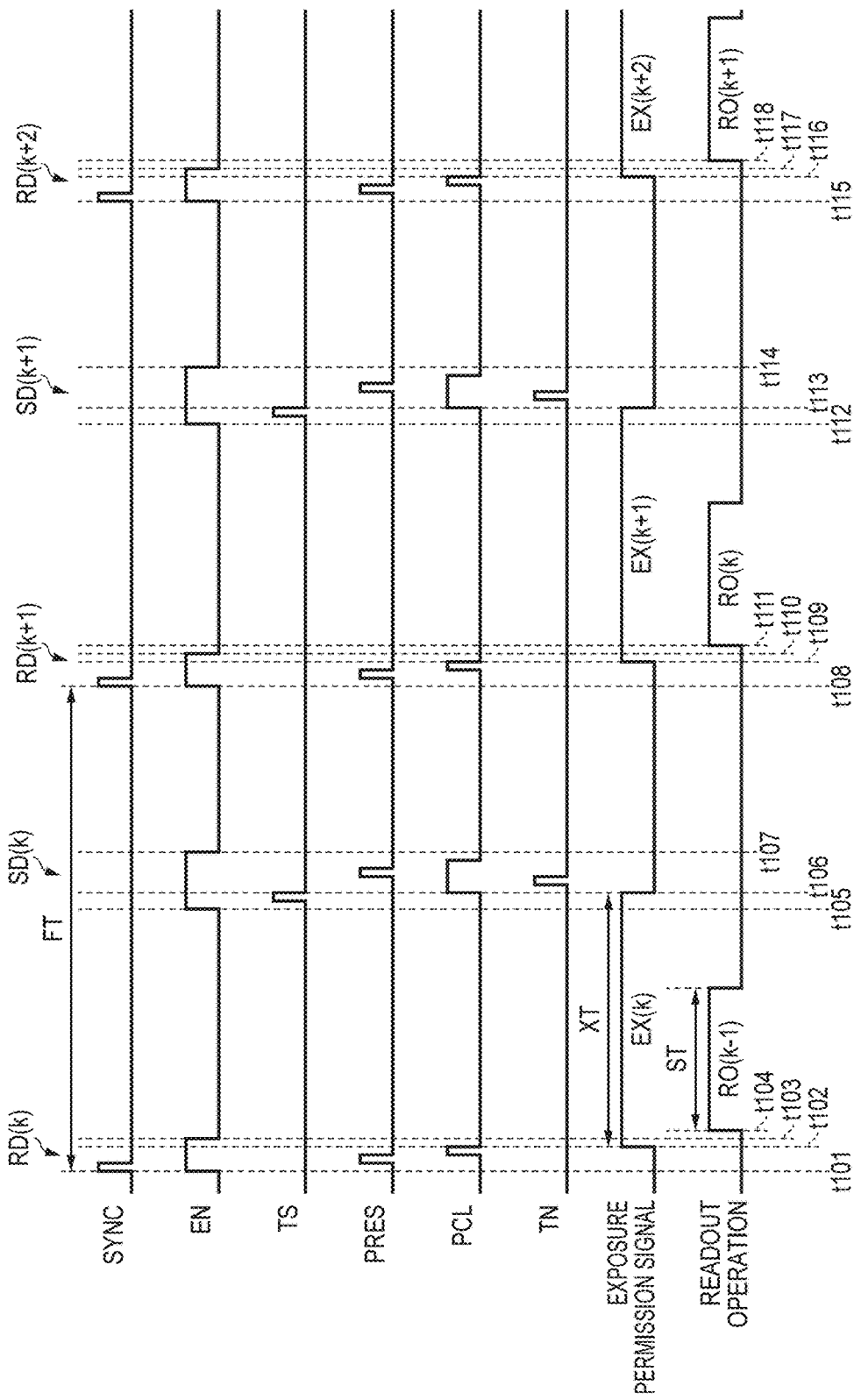

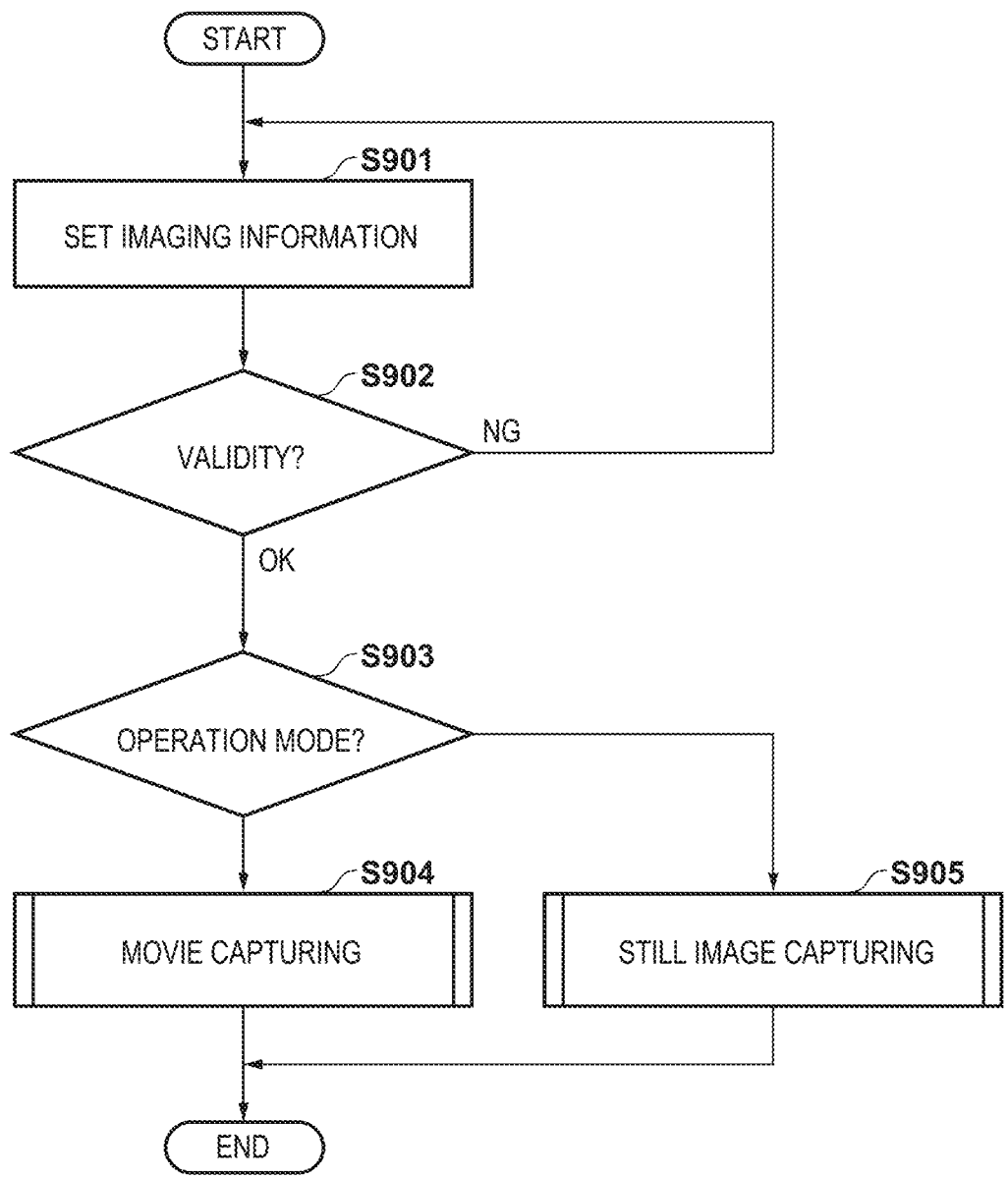

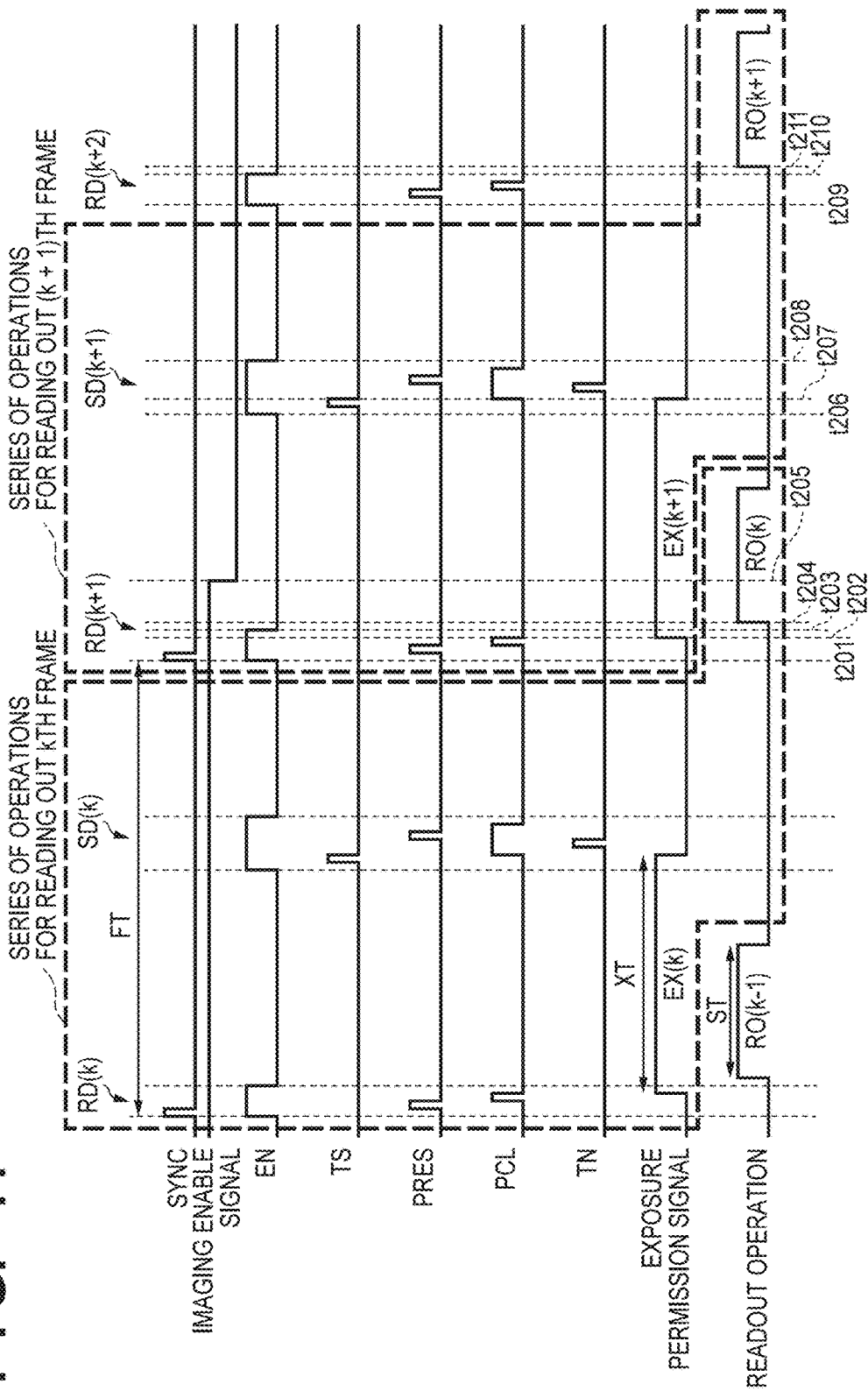

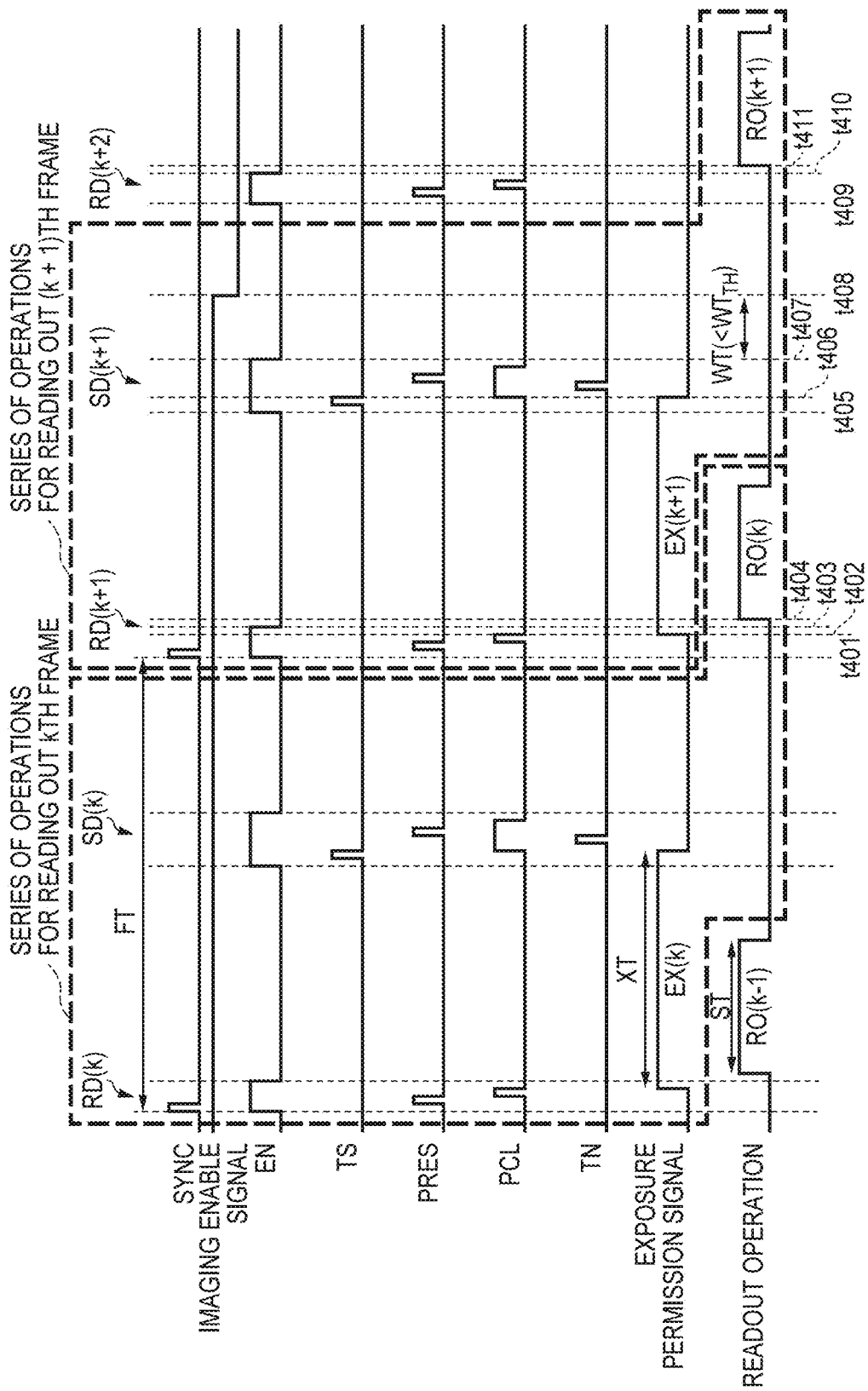

RADIATION IMAGING APPARATUS, DRIVING METHOD FOR THE SAME, AND NON-TRANSITORY COMPUTER-READABLE MEDIUM

BACKGROUND OF THE INVENTION

Field of the Invention

The present invention relates to a radiation imaging apparatus, a driving method for the same, and a non-transitory computer-readable medium.

Description of the Related Art

A radiation imaging apparatus includes a plurality of sensors and a driving unit which drives the plurality of sensors. Each sensor includes, for example, a detection element for detecting radiation and a reset unit for initializing the detection element. A sensor signal output from each sensor contains a noise component originating from a dark current or the like in addition to a signal component corresponding to the radiation detected by the detection element. For this reason, before the start of radiation irradiation, the driving unit performs a reset operation to initialize each detection element by using each reset unit.

For example, in an operation mode of repeatedly performing radiation imaging such as continuous shooting or movie capturing, the driving unit repeatedly performs a reset operation and an output operation of outputting sensor signals. One image data formed based on sensor signals obtained by such a series of operations is also called a "frame", and the quantity of image data obtained per unit time is also called a "frame rate". For example, when performing movie capturing, increasing the frame rate will smoothly play back a movie.

Japanese Patent Laid-Open No. 2012-85124 discloses an arrangement in which each sensor unit includes a sampling unit which samples sensor signals in addition to a plurality of sensors and a driving unit. Upon sampling a sensor signal, each sampling unit holds the sampled sensor signal until it samples the next frame. Therefore, after each sampling unit samples a sensor signal, the corresponding driving unit can perform an output operation of outputting the sampled sensor signal at an arbitrary timing. According to Japanese Patent Laid-Open No. 2012-85124, when starting, during an output operation for a given frame, a reset operation for the next frame, each driving unit interrupts the output operation and resumes the interrupted output operation upon finishing the reset operation.

According to the driving method disclosed in Japanese Patent Laid-Open No. 2012-85124, it is possible to shorten the intervals between radiation imaging operations to be repeatedly performed, when starting, during an output operation for a given frame, a reset operation for the next frame. This can increase the frame rate. In addition, according to the driving method disclosed in Japanese Patent Laid-Open No. 2012-85124, since no output operation is performed during the execution of a reset operation, it is possible to reduce the influence of noise originating from the reset operation on the image data obtained by the output operation.

A sensor signal contains a noise component originating from a dark current or the like in addition to a signal component. The noise component is based on the time from the end of a reset operation to the start of sampling of the sensor signal. For this reason, according to the driving method disclosed in Japanese Patent Laid-Open No. 2012-85124, there is a difference in noise component between a sensor signal output (by an output operation before interruption) before the start of a reset operation for the next frame and a sensor signal output (by an output operation after resumption) after the end of the reset operation. This can cause contrast unevenness as noise on the radiation image formed based on image data.

This can cause a problem when performing offset correction for removing a noise component originating from a dark current or the like with respect to image data. According to offset correction, a radiation image is formed based on the difference between the radiation image data obtained by imaging with radiation irradiation and the offset image data obtained by imaging without radiation irradiation. In order to properly remove the above unevenness noise by offset correction, it is necessary to perform these two imaging operations under the same imaging conditions (for example, conditions under which the time from the end of a reset operation to the start of sampling of a sensor signal remains the same). According to the driving method disclosed in Japanese Patent Laid-Open No. 2012-85124, since the time before the start of the sampling (that is, the timing of the interruption of an output operation) can changes for each frame, it is necessary to prepare a large amount of offset image data to perform offset correction.

SUMMARY OF THE INVENTION

The present invention provides a technique advantageous in preventing the occurrence of unevenness noise on a radiation image while increasing a frame rate.

One of the aspects of the present invention provides a radiation imaging apparatus comprising a plurality of sensors and a driving unit configured to drive the plurality of sensors, each of the plurality of sensors including a detection element configured to detect radiation, a sampling unit configured to sample a signal from the detection element, and a reset unit configured to initialize the detection element, wherein the driving unit performs a first reset operation of causing the reset unit to initialize the detection element, a first sampling operation of causing the sampling unit to sample a signal from the detection element in accordance with first radiation irradiation started after the first reset operation, a first output operation of outputting the signal sampled by the first sampling operation, a second reset operation of causing the reset unit to initialize the detection element, a second sampling operation of causing the sampling unit to sample a signal from the detection element in accordance with second irradiation started after the second reset operation following the first irradiation, and a second output operation of outputting the signal sampled by the second sampling operation, and wherein the driving unit starts the first output operation after completion of the second reset operation.

Further features of the present invention will become apparent from the following description of exemplary embodiments with reference to the attached drawings.

BRIEF DESCRIPTION OF THE DRAWINGS

FIGS. 7A to 7C are examples of driving timing charts for a sensor;

FIG. 8 is an example of a driving timing chart for a sensor in an operation mode of repeatedly performing radiation imaging;

FIG. 9 is an example of an operation flowchart for the radiation imaging apparatus;

FIG. 11 is an example of a driving timing chart for a sensor in an operation mode of repeatedly performing radiation imaging;

FIG. 13 is an example of a driving timing chart for a sensor in an operation mode of repeatedly performing radiation imaging.

DESCRIPTION OF THE EMBODIMENTS (1. Example of Arrangement of Radiation Imaging Apparatus)

Figure 1:
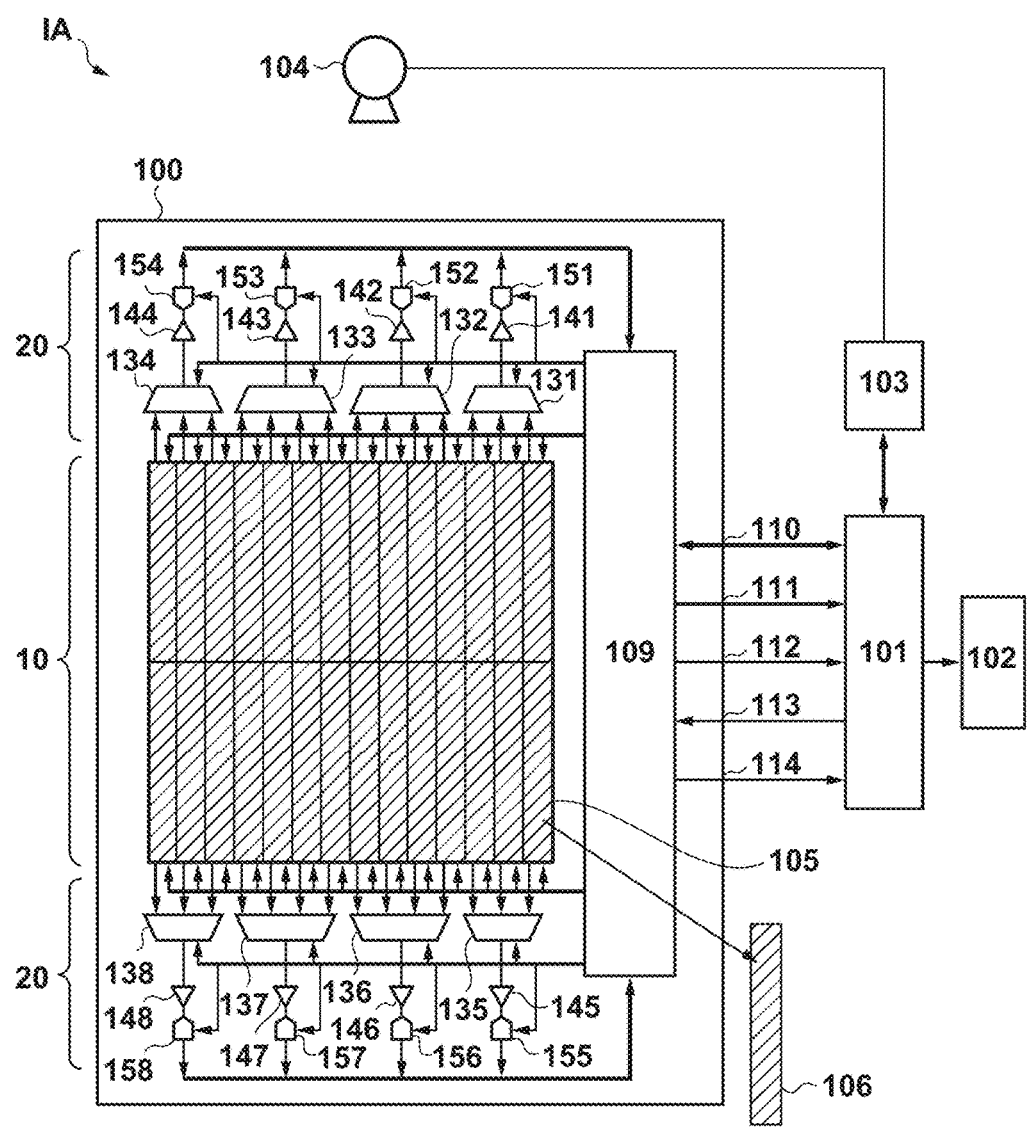
FIG. 1 is a view for explaining an example of the system configuration of a radiation imaging apparatus.

FIG. 1 is a system block diagram showing an example of the overall arrangement of a radiation inspection apparatus or radiation imaging apparatus IA (to be referred to as an "apparatus IA" hereinafter). The apparatus IA includes an imaging unit 100, a unit 101, a display unit 102, a radiation source controlling unit 103, and a radiation source 104.

The imaging unit 100 obtains image data representing the internal information of an object by radiation imaging, and outputs the image data to the unit 101. The unit 101 functions as a processing unit which receives the image data and performs image processing or data processing, and also functions as a controlling unit which exchanges control signals with each unit and performs system control or synchronization control on the overall apparatus IA. The display unit 102 includes, for example, a display and displays a radiation image based on image data from the unit 101.

In radiation imaging, the radiation source controlling unit 103 is controlled by the unit 101 in synchronism with the imaging unit 100, and outputs a signal for radiation irradiation to the radiation source 104 in response to a control signal from the unit 101. The radiation source 104 generates radiation (X-rays, $\alpha$-rays, $\beta$-rays, $\gamma$-rays, or the like) for radiation imaging in response to a signal from the radiation source controlling unit 103.

The imaging unit 100 includes a sensor unit 10, a readout unit 20 which reads out a signal from the sensor unit 10, and a controlling unit 109 which controls each unit in the imaging unit 100 while exchanging control signals and other signals with the unit 101.

The sensor unit 10 is a sensor panel 105 formed by arraying a plurality of sensor units 106. Each sensor unit 106 is a sensor chip manufactured by, for example, a known semiconductor manufacturing process using a semiconductor wafer such as a silicon wafer. A plurality of sensors are arrayed (to form a plurality of rows and a plurality of columns) on each sensor unit 106. The respective adjacent sensor units 106 may be physically isolated by dicing or not. For example, each sensor unit 106 formed on a semiconductor wafer may be inspected before dicing, and the sensor units 106, the inspection results on which satisfy a predetermined criterion, may be arrayed to form the sensor panel 105.

Although the arrangement in which the sensor units 106 are formed in 2 rows×14 columns for the sake of descriptive convenience is exemplified, the arrangement of the sensor unit 10 is not limited to this quantity.

A scintillator (not shown) for converting radiation into light is provided on the sensor unit 10. The sensor unit 10 obtains an electrical signal corresponding to light from the scintillator. In this case, a so-called indirect conversion type arrangement has been exemplified, in which radiation is converted into light by the scintillator, and the light is photoelectrically converted. However, a so-called direct conversion type arrangement may be used, which (directly) converts radiation into an electrical signal.

A readout unit 20 includes, for example, multiplexers 131 to 138, signal amplifying units 141 to 148, and A/D conversion units 151 to 158. The multiplexer 131 or the like functions as a selection unit which selects sensors as signal readout targets in a predetermined unit. For example, the multiplexer 131 or the like selects sensors as signal readout targets for each sensor unit 106 or column. The signal amplifying unit 141 or the like and the A/D conversion unit 151 or the like function as output units which output signals (sensor signals) from the respective sensors as the selected targets. For example, the signal amplifying unit 141 or the like amplifies a signal by using a differential amplifier or the like. The A/D conversion unit 151 or the like analog-to-digital-converts (A/D-converts) the amplified signal.

A plurality of electrodes for exchanging signals or supplying power are arranged on the upper and lower side portions of the sensor unit 10. The electrodes can be connected to an external circuit via a flying lead type printed wiring board (not shown). For example, the readout unit 20 reads out signals from the sensor unit 10 via the electrodes. In addition, the sensor unit 10 receives control signals from the controlling unit 109 via the electrodes.

The controlling unit 109 exchanges control signals and other signals with the unit 101 via various types of interfaces. The controlling unit 109 forms image data based on the sensor signals read out from the sensor unit 10 and outputs the data to the unit 101. A control interface 110 is an interface for exchanging apparatus information such as the operation state of the imaging unit 100 as well as setting information such as operation modes and various types of parameters and imaging information. An image data interface 111 is an interface for outputting image data from the imaging unit 100 to the unit 101.

In addition, the controlling unit 109 notifies the unit 101, by using a READY signal 112, that the imaging unit 100 is ready for imaging. In response to the READY signal 112 from the controlling unit 109, the unit 101 notifies the controlling unit 109 of a radiation irradiation start (exposure) timing by using a synchronization signal 113. The controlling unit 109 also starts radiation irradiation by outputting a control signal to the radiation source controlling unit 103 while an exposure permission signal 114 is in an enabled state.

The above arrangement is configured to perform control (specifically, for example, driving control, synchronization control, and operation mode control) on each unit in the apparatus IA. For example, an information input unit or information input terminal (not shown) may be connected to the unit 101 to allow the user to input imaging conditions (setting information such as operation modes and various types of parameters and other information). Each unit is controlled based on the input imaging conditions. For example, the unit 101 functions as a mode set unit and controls the overall apparatus IA to make it operate in an operation mode corresponding to the imaging conditions. The imaging unit 100 combines the sensor signals read out from the sensor unit 10 into one frame data, and outputs it as image data to the unit 101. The unit 101 performs predetermined image processing or data processing for the image data, and causes the display unit 102 to display the radiation image based on the image data.

Each unit in the apparatus IA is not limited to the above arrangement, and the arrangement of each unit may be changed depending on a purpose or the like, as needed. For example, the functions of two or more units may be implemented by one unit or part of the function of a given unit may be implemented by another unit.

Figure 2:
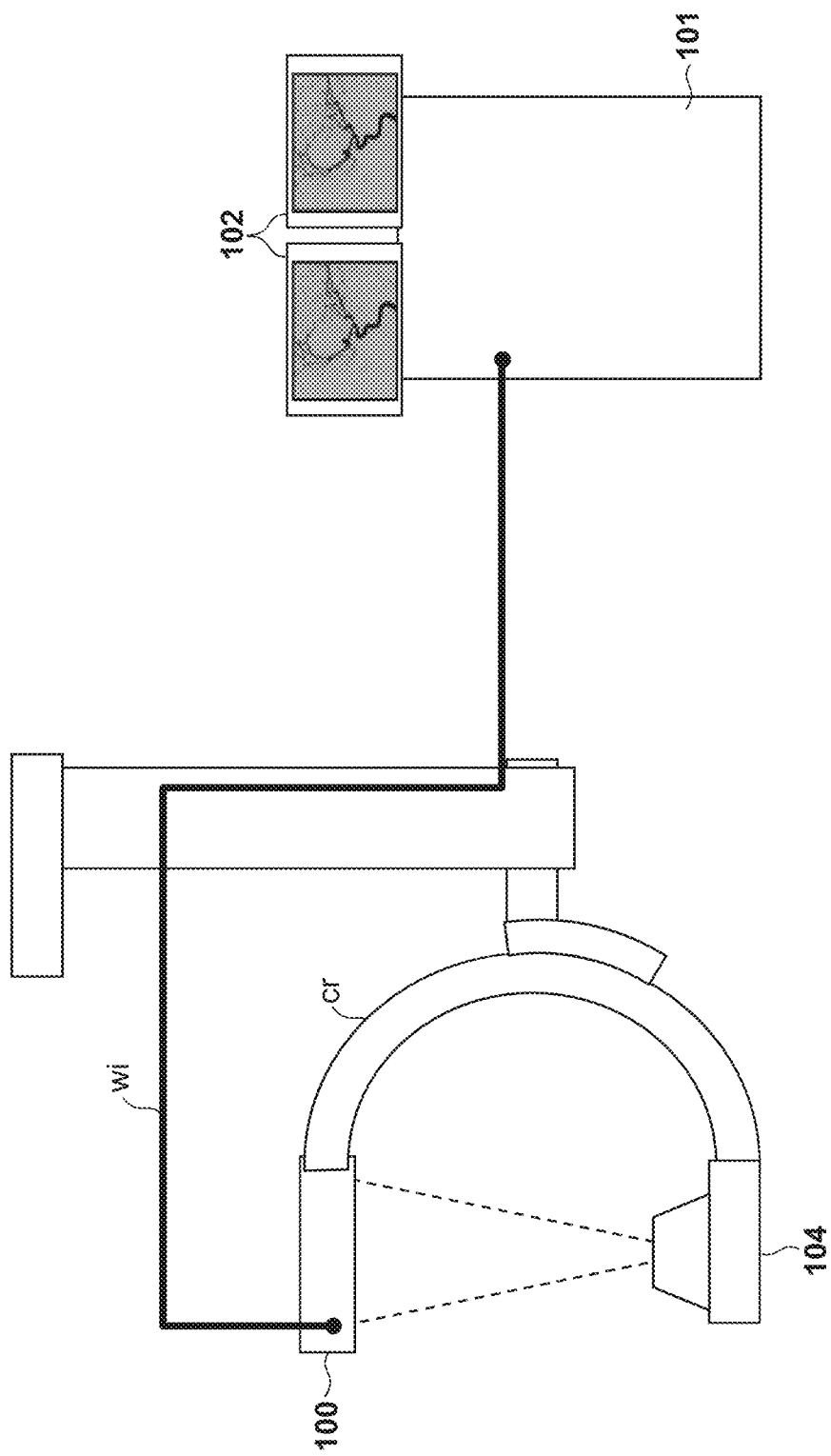
FIG. 2 is a view for explaining a concrete example of the arrangement of the radiation imaging apparatus.

A C-arm type radioscopic diagnosis apparatus $IA_1$ (to be referred to as a "C-arm apparatus $IA_1$" or simply as an "apparatus $IA_1$" hereinafter) as a specific example of the apparatus IA will be described with reference to FIG. 2. FIG. 2 is a schematic view for explaining part of the apparatus $IA_1$. In the apparatus $IA_1$, the imaging unit 100 and the radiation source 104 are fixed to the two ends of a C-arm cr. The apparatus $IA_1$ performs radiation imaging (3D imaging) while changing an irradiation angle by rotating the arm cr. The image data obtained by the imaging unit 100 is output to the unit 101 via, for example, a cable wi. The unit 101 forms a three-dimensional radiation image based on the image data and causes the display unit 102 to display the image.

(2. Example of Arrangement of Sensor Unit)

Figure 3:
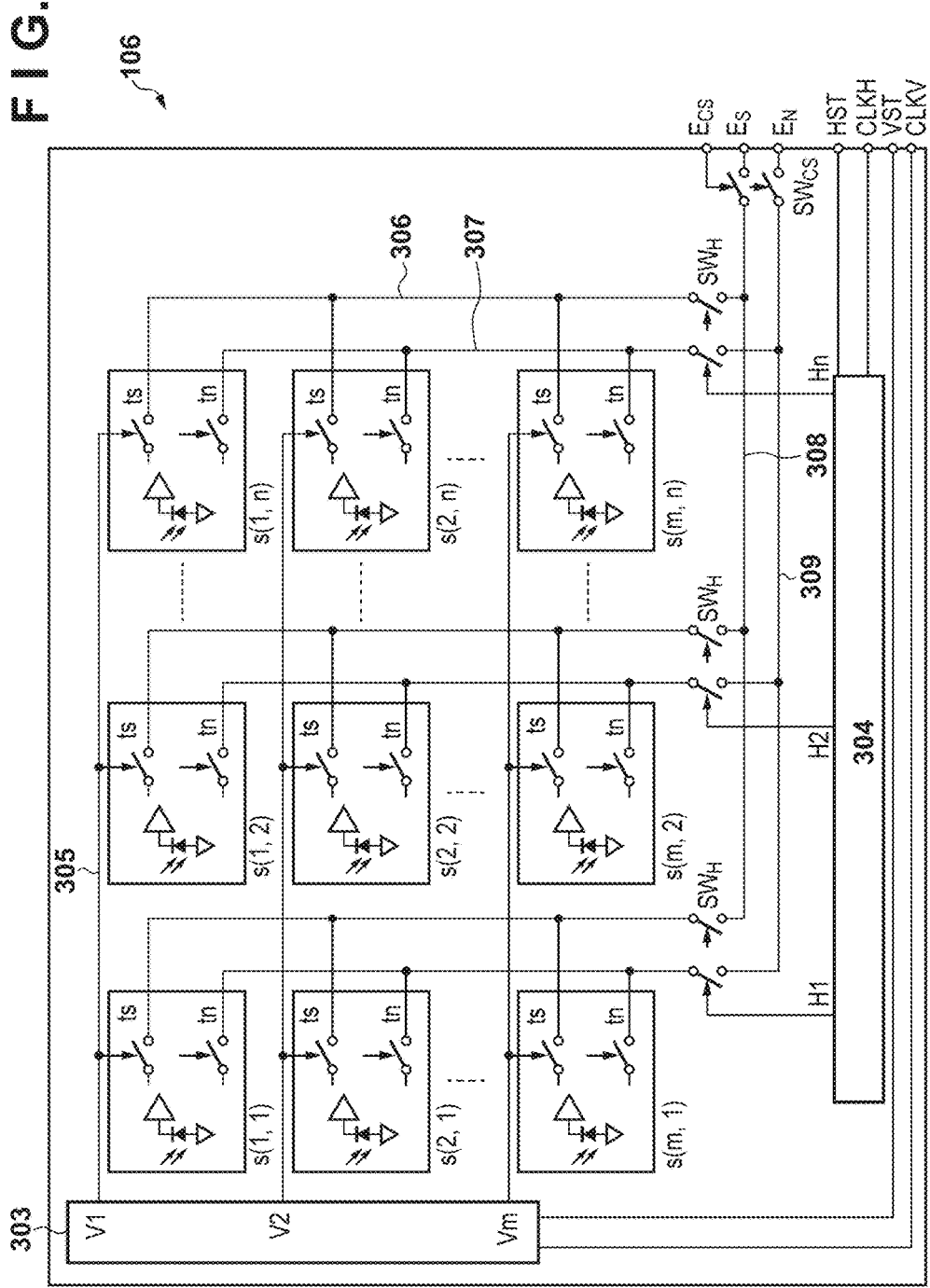
FIG. 3 is a view for explaining an example of the arrangement of a sensor unit.

FIG. 3 shows an example of the arrangement of a sensor unit 106 as one sensor chip. Each sensor unit 106 includes a plurality of sensors s, a vertical scanning circuit 303 for driving the plurality of sensors s, and a horizontal scanning circuit 304 for reading out signals from the plurality of sensors s.

The plurality of sensors s are arrayed to form, for example, m rows×n columns. Referring to FIG. 3, the sensor on the first row and the second column is represented by "s(1, 2)". Although described in detail later, each sensor s holds an S signal corresponding to a signal component and an N signal corresponding to a noise component. The S signal and the N signal are individually output from each sensor s.

The vertical scanning circuit 303 and the horizontal scanning circuit 304 are constituted by, for example, shift registers, and operate based on control signals from the controlling unit 109. The vertical scanning circuit 303 functions as a driving unit which drives the target sensors s as signal readout targets based on control signals from the controlling unit 109. More specifically, the vertical scanning circuit 303 supplies driving signals to the plurality of sensors s via control lines 305, and drives the plurality of sensors s for each row based on the driving signals. In addition, the horizontal scanning circuit 304 causes the sensors s on each column to sequentially output signals (which operation will also be referred to as "horizontal transferring") based on control signals from the controlling unit 109. More specifically, the horizontal scanning circuit 304 causes the sensors s driven by the vertical scanning circuit 303 to sequentially output signals (S signals and N signals) to the outside via column signal lines 306 and 307 and analog output lines 308 and 309.

Each sensor unit 106 includes a terminal $E_S$ for reading out the S signals held in the sensors s and a terminal $E_N$ for reading out the N signals held in the sensors s. The sensor unit 106 also includes a select terminal $E_{CS}$. Activating the signal received by the terminal $E_{CS}$ will read out signals from each sensor s of the sensor unit 106 via the terminals $E_S$ and $E_N$.

More specifically, each sensor s includes a terminal ts for outputting the S signal and a terminal tn for outputting the N signal. The terminal ts is connected to the column single line 306. The terminal tn is connected to the column signal line 307. The column single lines 306 and 307 are connected to the analog output lines 308 and 309 via switches $SW_H$ which are set in the conducting state in response to control signals from the horizontal scanning circuit 304. Signals from the analog output lines 308 and 309 are output from the terminals $E_S$ and $E_N$ via switches $SW_{CS}$ which are set in the conducting state in response to the signal received at the terminal $E_{CS}$.

In addition, each sensor unit 106 includes further includes a terminal VST and the like which receive control signals for controlling the vertical scanning circuit 303 and the horizontal scanning circuit 304. The terminal VST receives a start pulse input to the vertical scanning circuit 303. A terminal CLKV receives a clock signal input to the vertical scanning circuit 303. A terminal HST receives a start pulse input to the horizontal scanning circuit 304. A terminal CLKH receives a clock signal input to the horizontal scanning circuit 304. The controlling unit 109 supplies these control signals.

With the above arrangement, in each sensor unit 106, the sensors s are controlled for each row, and the sensors s on each column sequentially output signals (S signals and N signals), thereby performing signal readout.

(3. Example of Arrangement of Readout Unit)

Figure 4:
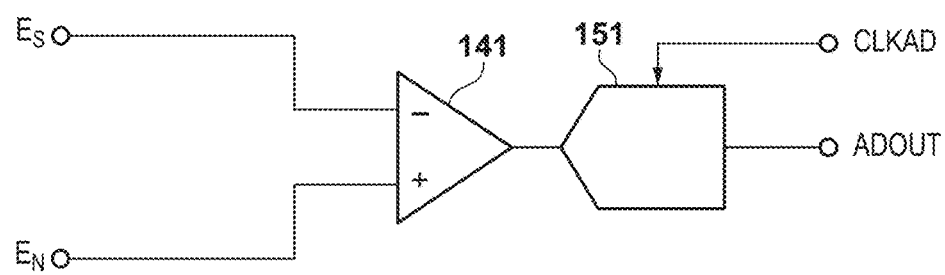
FIG. 4 is a circuit diagram for explaining an example of the arrangement of a readout unit.

FIG. 4 shows part of the circuit arrangement of the readout unit 20. A signal from the terminal $E_S$ is input to the inverting input terminal (indicated by "−" in FIG. 4) of the signal amplifying unit 141. A signal from the terminal $E_N$ is input to the non-inverting input terminal (indicated by "+" in FIG. 4) of the signal amplifying unit 141. The signal amplifying unit 141 amplifies the difference (signal value difference) between the signal from the terminal $E_S$ and the signal from the terminal $E_N$, and outputs a signal corresponding to the difference to the A/D conversion unit 151. The A/D conversion unit 151 has received a clock signal at the CLKAD terminal, and A/D-converts (analog-to-digital converts) the signal from the signal amplifying unit 141 based on the clock signal. The A/D-converted signal is output to the control unit 109 via the ADOUT terminal.

Note that for the sake of descriptive convenience, the signal amplifying unit 141 and the A/D conversion unit 151 have been exemplified. However, the same applies to an arrangement further including the multiplexer 131.

(4. Example of Driving Method for Sensor Unit)

Figure 5:
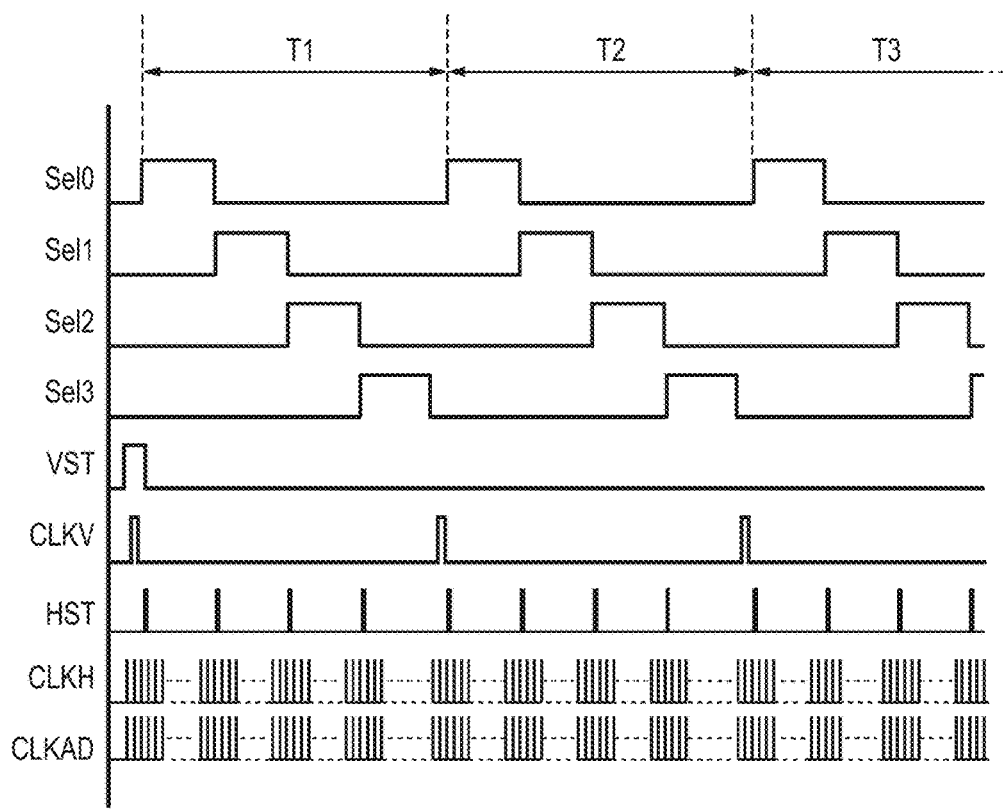
FIG. 5 is a timing chart for explaining an example of a driving method for the radiation imaging apparatus.

FIG. 5 is a timing chart for a readout operation RO for reading out signals from the imaging unit 100. The abscissa represents a time axis, and the ordinate represents each control signal. In this case, for the sake of descriptive convenience, a case in which signals are read out from the four sensor units 106, that is, $106_0$ to $106_3$, will be described.

Selection signals Sel, that is, Sel0 to Sel3, are control signals for selecting the sensor units 106 as signal readout targets. The selection signals Sel0 to Sel3 correspond to the sensor units $106_0$ to $106_3$, and are respectively input to the terminals $E_{CS}$ of the corresponding sensor units 106. If, for example, the sensor unit $106_1$ is a signal readout target, the signal Sel1 is set at high level (H), and the other selection signals Sel0, Sel2, and Sel3 are set at low level (L).

Other control signals including a signal VST indicate control signals to be input to the respective terminals. For example, a control signal input to the terminal VST is expressed as the signal VST. The same applies to other control signals.

The signal VST is a start pulse signal for row selection, based on which the vertical scanning circuit 303 selects the sensors s on the first row in the sensor unit 106 selected by the selection signal Sel. A signal CLKV is a clock signal. Every time this clock signal is received at the terminal CLKV, the selected row is sequentially shifted from the first row to the mth row (that is, the respective sensors s are sequentially selected from the first row to the mth row).

A signal HST is a start pulse signal for column selection, based on which the horizontal scanning circuit 304 elects the respective sensors s on the first column in the sensor unit 106 selected by the selection signal Sel. A signal CLKH is a clock signal. Every time the clock signal is received at the terminal CLKH, the selected column is sequentially shifted from the first column to the nth column (that is, the respective sensors s are sequentially selected row by row from the first column to the nth column).

A signal CLKAD is a clock signal, based on which an A/D conversion unit 108 A/D-converts a signal corresponding to the difference between the S signal and the N signal in each sensor s, as described above.

First of all, after the signal VST and the signal CLKV are set at H, the selection signals Sel0 to Sel3 are sequentially set at H to sequentially select the sensor units $106_0$, to $106_3$. At the timing when a given selection signal Sel is set at H (or after the signal is set at H), the signal HST is set at H. Thereafter, the clock signals CLKH and CLKAD are input until the next selection signal Sel is set at H.

With such a driving method, for example, in a first interval T1 in FIG. 5, signals from the respective sensors s on the first row are read out from each of the sensor units $106_0$, to $106_3$. More specifically, signals from the respective sensors s on the first row in the sensor unit $106_0$ are sequentially A/D-converted in the order of the first column to the nth column. Signals from the respective sensors s on the first row in the sensor unit $106_1$ are then A/D-converted in the same manner. Thereafter, signals from the respective sensors s on the first row in the sensor unit $106_2$ are A/D-converted in the same manner. Furthermore, thereafter, signals from the respective sensors s on the first row in the sensor unit $106_3$ are A/D-converted in the same manner. The same operation as that in the first interval T1 is performed in and after a second interval T2 (signal readout from the respective sensors s on the second row in each sensor unit 106).

The readout operation RO is performed in the above manner. The readout operation RO may be termed as output driving of outputting signals from the respective sensors s from the viewpoint of the vertical scanning circuit 303 functioning as a driving unit, the controlling unit 109 which controls its operation, or the unit 101 which comprehensively performs the control operation.

(5. Example of Arrangement of Unit Sensor)

Figure 6:
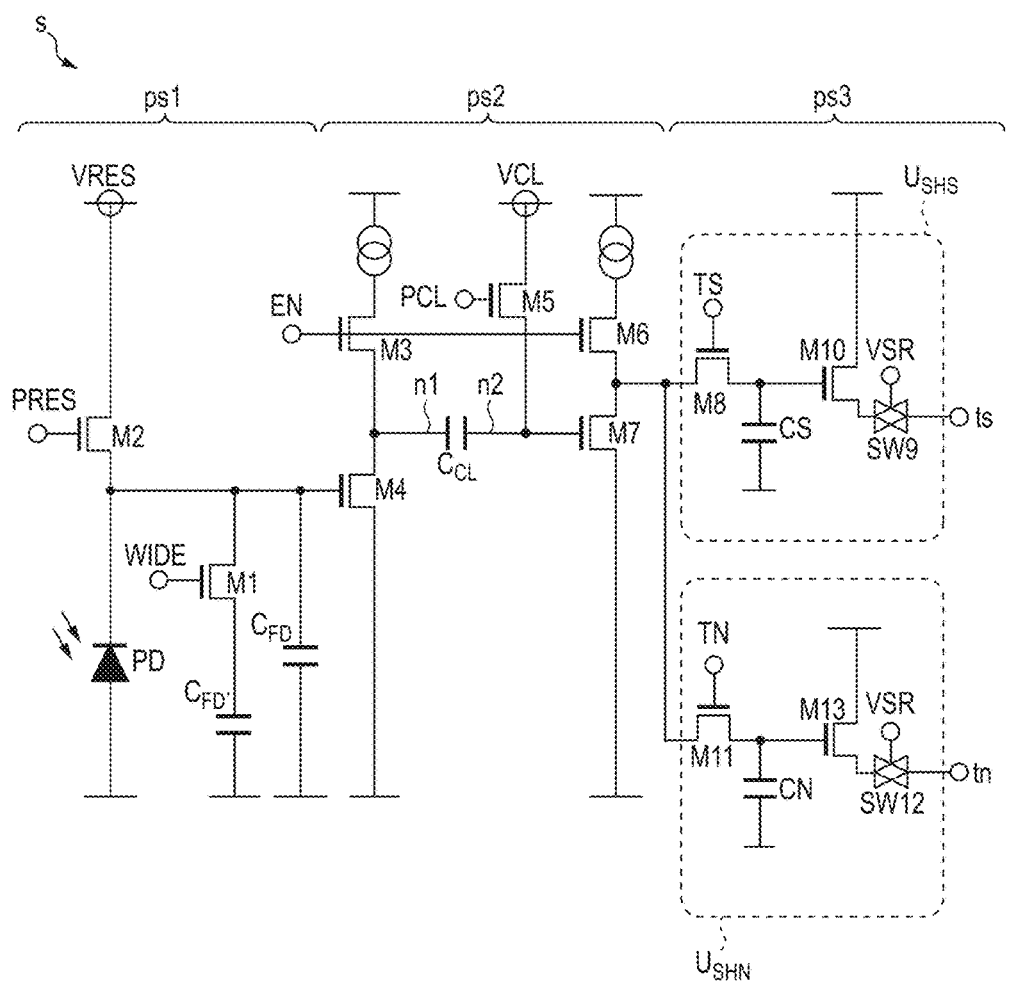
FIG. 6 is a circuit diagram for explaining an example of the arrangement of a unit sensor.

FIG. 6 exemplarily shows the circuit arrangement of each of unit sensors s arrayed in the sensor unit 106. Each sensor s includes, for example, a first portion ps1, a second portion ps2, and a third portion ps3.

The first portion ps1 includes a photodiode PD, transistors M1 and M2, a floating diffusion capacitor $C_{FD}$ (to be referred to as an FD capacitor $C_{FD}$ hereinafter), and a sensitivity switching capacitor $C_{FD}'$.

The photodiode PD is a photoelectric conversion element, which converts light (scintillator light) generated by the scintillator described above in accordance with irradiated radiation into an electrical signal. More specifically, the photodiode PD generates an amount of charges corresponding to the amount of scintillator light. The voltage of the FD capacitor $C_{FD}$ corresponding to the amount of generated charges is output to the second portion ps2.

The above description has exemplified the arrangement using the photodiode PD as a detection element for detecting radiation, assuming that the sensor unit 10 is of the indirect conversion type described above. However, another type of photoelectric conversion element may be used. In addition, if the sensor unit 10 is of the direct conversion type described above, a conversion element which directly converts radiation into an electrical signal may be used as the detection element.

The sensitivity switching capacitor $C_{FD}'$ is used to switch the sensitivity of the sensor s with respect to radiation, and is connected to the photodiode PD via the transistor M1 (switch element). When a signal WIDE is activated, the transistor M1 is set in the conducting state to output the voltage of the combined capacitor of the FD capacitor $C_{FD}$ and the capacitor $C_{FD}'$ to the second portion ps2.

With this arrangement, the sensor s is set in the low sensitivity mode when the signal WIDE is at H, and set in the high sensitivity mode when the signal WIDE is at L. In this manner, the sensitivity of the sensor s with respect to radiation can be changed depending on whether to use the capacitor $C_{FD}'$.

When a signal PRES is activated, the transistor M2 resets (initializes) the charges in the photodiode PD, and resets the voltage output, to the second portion ps2.

The second portion ps2 includes transistors M3 to M7, a clamp capacitor $C_{CL}$, and a constant current source (for example, a transistor with a current mirror arrangement). The transistor M3, the transistor M4, and the constant current source are connected in series to form a current path. When an enable signal EN input to the gate of the transistor M3 is activated, the transistor M4 which receives a voltage from the first portion ps1 performs a source-follower operation to output a voltage corresponding to the voltage from the first portion ps1.

On the subsequent stage of the above arrangement, a clamp circuit constituted by transistors M5 to M7 and the clamp capacitor $C_{CN}$, is provided. More specifically, one terminal n1 of the clamp capacitor $C_{CL}$ is connected to the node between the transistor M3 and the transistor M4 of the second portion ps2. The other terminal n2 is connected to a clamp voltage VCL via the transistor M5. In addition, the transistor M6, the transistor M7, and the constant current source are connected in series to form a current path. The terminal n2 is connected to the gate of the transistor M7.

This arrangement removes kTC noise (so-called reset noise) generated in the photodiode PD of the first portion ps1.

More specifically, a voltage corresponding to the voltage from the first portion ps1 at the reset time described above is input to the terminal n1 of the clamp capacitor $C_{CL}$. When a clamp signal PCL is activated, the transistor M5 is set in the conducting state to input the clamp voltage VCL to the terminal n2 of the clamp capacitor $C_{CL}$. With this operation, the potential difference between the two terminals n1 and n2 of the clamp capacitor $C_{CL}$ is clamped as a noise component. In other words, the second portion ps2 can hold a voltage corresponding to the charges generated in the photodiode PD, and functions as a holding unit which holds a voltage corresponding to kTC noise in the clamp capacitor $C_{CL}$. In this arrangement, the second portion ps2 holds the voltage obtained by removing the clamped noise component from the voltage output from the transistor M4, which performs a source-follower operation, in accordance with the charges generated in the photodiode PD.

The enable signal EN is supplied to the gate of the transistor M6. When the enable signal EN is activated, the transistor M7 performs a source-follower operation to output a voltage corresponding to the gate voltage of the transistor M7 to the third portion ps3. For example, the gate voltage of the transistor M7 changes as charges are generated in the photodiode PD, and a voltage corresponding to the changed voltage is output to the third portion ps3.

The third portion ps3 includes transistors M8, M10, M11, and M13, analog switches SW9 and SW12, and capacitors CS and CN. The unit constituted by the transistors M8 and M10, the analog switch SW9, and the capacitor CS will be referred to as a "first unit $U_{SHS}$" hereinafter.

In the first unit $U_{SHS}$, the transistor M8 and the capacitor CS constitute a sample/hold circuit. More specifically, a signal from the second portion ps2 is held as the S signal in the capacitor CS by switching the state (the conducting state or the non-conducting state) of the transistor M8 by using a control signal TS. In other words, the first unit $U_{SHS}$ functions as a first sampling unit which samples the S signal. The transistor M10 performs a source-follower operation. This amplifies the S signal. The amplified S signal is output from the terminal ts by setting the switch SW9 in the conducting state by using a control signal VSR.

Like the first unit $U_{SHS}$, the transistors M11 and M13, the analog switch SW12, and the capacitor CN constitute a "second unit $U_{SHN}$" which outputs a signal from the terminal tn. The second unit $U_{SHN}$ holds the N signal in the capacitor CN. In other words, the second unit $U_{SHN}$ functions as the second sampling unit which samples the N signal. In addition, as described above, the readout unit 20 reads out the difference between the S signal and the N signal via the terminals ts and tn. This removes FPN (Fixed Pattern Noise) originating from the second portion ps2.

As described above, the sensor s holds the S signal and the N signal in the capacitors CS and CN. The held S and N signals are read out by so-called nondestructive readout by setting the analog switches SW9 and SW12 in the conducting state. That is, while the transistors M8 and M11 are set in the non-conducting state, it is possible to read out the held S and N signals at an arbitrary timing.

(6. Example of Driving Method for Unit Sensor)

FIGS. 7A, 7B, and 7C show driving timing charts for each sensor s when performing radiation imaging once. This driving method can be applied to operation modes such as still image capturing. For the sake of descriptive convenience, a case in which the sensor s is set in the high sensitivity mode (that is, when the control signal WIDE is at L) will be described.

As shown in FIG. 7A, at time t50, information setting necessary for the execution of imaging, for example, operation mode setting, is performed. At time t51, reset driving RD for resetting each sensor s and the clamp capacitor $C_{CL}$ is performed in response to a synchronization signal SYNC from the unit 101. At time t60, sampling driving SD for reading out an image signal is performed. Thereafter, the readout operation RO (see FIG. 5) described above is performed.

FIG. 7B is a specific timing chart for the reset driving RD. In the reset driving RD, a reset operation of resetting the photodiode PD and an operation of holding a voltage corresponding to kTC noise in the clamp capacitor $C_{CL}$ are performed in response to the synchronization signal SYNC.

At time t51, the enable signal EN is set at H to set transistors M3 and M6 in the conducting state. This makes transistors M4 and M7 ready for a source-follower operation.

At time t52, a signal PRES is set at H to set the transistor M2 in the conducting state. This connects the photodiode PD to a reference voltage VRES and resets the photodiode PD and the voltage of the capacitor $C_{FD}$. In addition, a voltage corresponding to the gate voltage of the transistor M4 at the reset time is supplied to one terminal n1 of the clamp capacitor $C_{CL}$ (the terminal on the transistor M4 side).

At time t53, the signal PCL is set at H to set the transistor M5 in the conducting state. With this operation, the clamp voltage VCL is supplied to the terminal n2 of the clamp capacitor $C_{CL}$ (the terminal on the transistor M7 side).

At time t54, the signal PRES is set at L to set the transistor M2 in the non-conducting state. With this operation, the terminal n1 of the clamp capacitor $C_{CL}$ is set to a voltage corresponding to the gate voltage of the transistor M4 at the reset time.

At time t55, the signal PCL is set at L to set the transistor M5 in the non-conducting state. With this operation, the clamp capacitor $C_{CL}$ holds charges corresponding to the potential difference between the terminal n1 and the terminal n2 (the potential difference between the voltage based on the reference voltage VRES and the clamp voltage VCL), thereby clamping kTC noise caused by the heat of the photodiode PD or the like.

At time t56, the enable signal EN is set at L to set the transistors M3 and M6 in the non-conducting state. With this operation, the transistors M4 and M7 are set in the non-conducting state. Thereafter, the above exposure permission signal 114 is set at H (permitted state).

With the above operation, a series of operations for the reset driving RD is complete. That is, in the reset driving RD, while the photodiode PD is reset, the clamp capacitor $C_{CL}$ is reset, and a voltage corresponding to kTC noise is held in the reset clamp capacitor $C_{CL}$. Subsequently, upon radiation irradiation, the photodiode PD generates charges corresponding to the dose of irradiated radiation.

Note that the reset driving RD is collectively performed for all the sensors to prevent the control timing differences, thereby maintaining data continuity between adjacent sensor units and adjacent sensors.

FIG. 7C is a specific timing chart for the sampling driving SD. In the sampling driving SD, a signal level corresponding to the amount of charges generated in the photodiode PD is sampled as the S signal, and held in a capacitor CS. In addition, in the sampling driving SD, a noise level corresponding to the fixed pattern noise caused by manufacture variations of the arrangements of sensors s and the respective elements is sampled as the N signal and held in the capacitor CN.

At time t60, the enable signal EN is set at H to set the transistors M3 and M6 in the conducting state to make the transistors M4 and M7 ready for a source-follower operation. The gate voltage of the transistor M4 changes in accordance with the amount of charges generated and accumulated in the photodiode PD. A voltage corresponding to the changed gate voltage is input to the terminal n1 of the clamp capacitor $C_{CL}$ to change the potential at the terminal n1. The potential at the terminal n2 of the clamp capacitor $C_{CL}$ then changes with a change in the potential at the terminal n1.

At time t61, the signal TS is set at H to set the transistor M8 in the conducting state. With this operation, the capacitor CS is charged with a voltage corresponding to the potential at the terminal n2 (the above changed potential at the terminal n2).

At time t62, the signal TS is set at L to set the transistor M8 in the non-conducting state. With this operation, the above voltage is fixed in the capacitor CS (sampling of the S signal). At time t62, the exposure permission signal 114 is set at L (inhibited state). Note that the interval between time t54 and time t62 corresponds to the charge accumulation time (to be also simply referred to as the "accumulation time") of the photodiode PD. That is, during this period, in addition to the amount of charges corresponding to the dose of irradiated radiation, the amount of charges originating from a dark current or the like and corresponding to the period is accumulated in the photodiode PD.

At time t63, the signal PCL is set at H to set the transistor M5 in the conducting state. With this operation, the clamp voltage VCL is supplied to the terminal n2 of the clamp capacitor $C_{CL}$ (the terminal on the transistor M7 side).

At time t64, a signal TN is set at H to set the transistor M11 in the conducting state. With this operation, the capacitor CN is charged with a voltage corresponding to the potential at the terminal n2 (the above supplied voltage VCL).

At time t65, the signal TN is set at L to set the transistor M11 in the non-conducting state. With this operation, the above voltage is fixed in the capacitor CN (sampling of the N signal).

At time t66, the signal PRES is set at H to set the transistor M2 in the conducting state. With this operation, the voltage of the FD capacitor $C_{FD}$ (and the capacitor $C_{FD}'$) is reset to the reference voltage VRES, and the voltage at the terminal n1 is also reset.

At time t67, the signal PRES is set at L to set the transistor M2 in the non-conducting state. With this operation, the terminal n1 of the clamp capacitor $C_{CL}$ is set to a voltage corresponding to the gate voltage of the transistor M4 at the reset time.

Finally, at time t68, the signal PCL is set at L to set the transistor M5 in the non-conducting state. At time t69, the enable signal EN is set at L to set the transistors M3 and M6 in the non-conducting state (set the transistors M4 and M7 in the non-conducting state).

In summary, in the sampling driving SD, the S signal is sampled in the interval between time t61 and time t62. In the interval between time t63 and time t68, the potential at the terminal n2 of the clamp capacitor $C_{CL}$ is reset. During this interval, the N signal is sampled in the interval between time t64 and time t65, and the photodiode PD is then reset in the interval between time t66 and time t67.

In the above manner, a series of operations for the sampling driving SD is complete. That is, in the sampling driving SD, a signal level corresponding to the amount of charges generated in the photodiode PD is sampled as the S signal and held in the capacitor CS, and a noise level corresponding to fixed pattern noise is sampled as the N signal and held in the capacitor CN.

Note that the sampling driving SD can be collectively performed for all the sensors to prevent control timing differences between the respective sensor units 106 as in the reset driving RD described above.

In the readout operation RO after the sampling driving SD, as described above, signals corresponding to the differences between the S signals and the N signals are sequentially A/D converted and output as one image data.

(7. Example of Driving Method in Operation Mode of Repeatedly Performing Radiation Imaging)

FIG. 8 exemplarily shows a driving timing chart for each sensor s in an operation mode of repeatedly performing radiation imaging. This driving method can be applied to, for example, operation modes such as continuous shooting and movie capturing. In the driving method, every time the synchronization signal SYNC is received, a series of operations is performed, including the reset driving RD, radiation irradiation, the sampling driving SD, and the readout operation RO. Note that if the interval from the reception of a given synchronization signal SYNC to the reception of the next synchronization signal SYNC is represented by FT, it is possible to change (increase/decrease) the frame rate by changing (decreasing/increasing) the interval FT.

First of all, at time t101, for example, the kth synchronization signal SYNC is received, the kth reset driving RD (to be referred to as "reset driving RD(k)" for discrimination) is performed in the interval between time t101 and time t103. In addition, at time t102 after at least the signal PCL is set at L, the exposure permission signal is set at H to start the kth radiation irradiation (to be referred to as "irradiation EX(k)").

Subsequently, at time t104 after at least the reset driving RD(k) is finished, the (k−1)th readout operation RO (to be referred to as a "readout operation RO(k−1)") is performed. With the readout operation RO(k−1), the image data based on the signal sampled by (k−1)th sampling driving SD(k−1) (not shown) is obtained. That is, the (k−1)th frame is obtained.

In the interval between time t105 and t107, for example, the kth sampling driving SD (to be referred to as "sampling driving SD(k)") is performed. At time t106 before at least the signal PCL is set at H, the irradiation EX(k) is finished. With the sampling driving SD(k), each sensor s samples a signal corresponding to the irradiation EX(k).

Subsequently, at time t108, the (k+1)th synchronization signal SYNC is received, and (k+1)th reset driving RD(k+1) is performed in the interval between time t108 and time t110. In addition, at time t109 after at least the signal PCL is set at L, the exposure permission signal is set at H to start (k+1)th radiation irradiation EX(k+1).

Subsequently, at time till after the end of at least the reset driving RD(k+1), the kth readout operation RO(k) is performed. With the readout operation RO(k), image data is obtained based on the signal sampled by the sampling driving SD(k). That is, the kth frame is obtained.

In the interval between time t112 and t114, for example, the (k+1)th sampling driving SD(k+1) is performed. At time t113 before at least the signal PCL is set at H, irradiation EX(k+1) is finished. With the sampling driving SD(k+1), each sensor s samples a signal corresponding to the radiation irradiation EX(k+1).

Subsequently, at time t115, the (k+2)th synchronization signal SYNC is received, and (k+2)th reset driving RD(k+2) is performed in the interval between time t115 and time t117. In addition, at time t116 after at least the signal PCL is set at L, the exposure permission signal is set at H to start (k+2)th radiation irradiation EX(k+2).

Subsequently, at time t118 after the end of at least the reset driving RD(k+2), the (k+1)th readout operation RO(k+1) is performed. With the readout operation RO(k+1), image data is obtained based on the signal sampled by the sampling driving SD(k+1). That is, the (k+1)th frame is obtained.

Following the procedure exemplified above, a series of operations for the reset driving RD, radiation irradiation, the sampling driving SD, and the readout operation RO is repeatedly performed from time t117 in the same manner.

In this case, according to this driving method, image data based on the kth radiation imaging, that is, the kth frame, is obtained by performing the reset driving RD(k), the irradiation EX(k), and the sampling driving SD(k) in the interval between time t101 and t107 and the readout operation RO(k) at time t111. Subsequently, image data based on the (k+1)th radiation imaging, that is, the (k+1)th frame, is obtained by performing the reset driving RD(k+1), the irradiation EX(k+1), and the sampling driving SD(k+1) in the interval between time t108 and t114 and the readout operation RO(k+1) at time t118.

For example, the kth readout operation RO(k) is started after the completion of the (k+1)th reset driving RD(k+1) as the next reset driving. This reduces or substantially eliminates the influence of reset noise originating from the reset driving RD(k+1) on the image data obtained by the readout operation RO(k). Therefore, this driving method is advantageous in preventing the occurrence of unevenness noise on a radiation image in an operation mode of repeatedly performing radiation imaging such as continuous shooting or movie capturing while increasing a frame rate.

This is also advantageous in performing offset correction for the removal of a noise component originating from a dark current or like from the image data obtained by this driving method. For example, offset correction is performed such that another readout operation (to be referred to as a "readout operation $RO_F$") is performed without radiation irradiation, and the image data obtained by the readout operation RO is corrected by using the offset image data obtained by the readout operation $RO_F$. Offset image data is also called dark image data, which is obtained by, for example, performing a series of operations including reset driving (to be referred to as "reset driving $RD_F$"), sampling driving (to be referred to as "sampling driving $SD_F$"), and the readout operation $RO_F$ without radiation irradiation.

According to offset correction, a radiation image is formed based on the difference between the image data obtained by the readout operation RO and the offset image data obtained by the readout operation $RO_F$. It is necessary to perform the above series of operations for obtaining offset image data under the same imaging conditions as those for radiation imaging (conditions under which the time from the reset operation RD to the sampling driving SD is equal to the time from the reset operation $RD_F$ to the sampling driving $SD_F$).

According to the driving method disclosed in Japanese Patent Laid-Open No. 2012-85124 described above, changing a frame rate may change the time from the reset operation RD to the sampling driving SD. For this reason, every time a frame rate is changed, it is necessary to obtain offset image data corresponding to the changed frame rate. Alternatively, it is necessary to obtain, in advance, offset image data corresponding to all frame rates or a plurality of frame rates.

In contrast to this, according to this embodiment, since the time from the reset operation RD to the sampling driving SD can be maintained constant regardless of frame rates, it is possible to decrease the number of offset image data to be obtained. This is especially advantageous, for example, in the case of changing a frame rate in accordance with the movement of the C-arm cr when performing radiation imaging by using the C-arm apparatus $IA_1$ exemplarily shown in FIG. 2 described above.

Let XT be the time taken for one radiation irradiation operation, that is, the interval during which an exposure permission signal corresponding to the irradiation EX (EX(k) or the like) is set at H, and ST be the time or interval required for one readout operation RO. In this case, XT>ST preferably holds when starting the sampling driving SD while finishing the irradiation EX or when starting the sampling driving SD within a relatively short period of time after the end of the irradiation EX. However, XT≤ST may be set when performing a series of operations so as to start the sampling driving SD after the end of both the irradiation EX and the readout operation RO.

Figure 12:
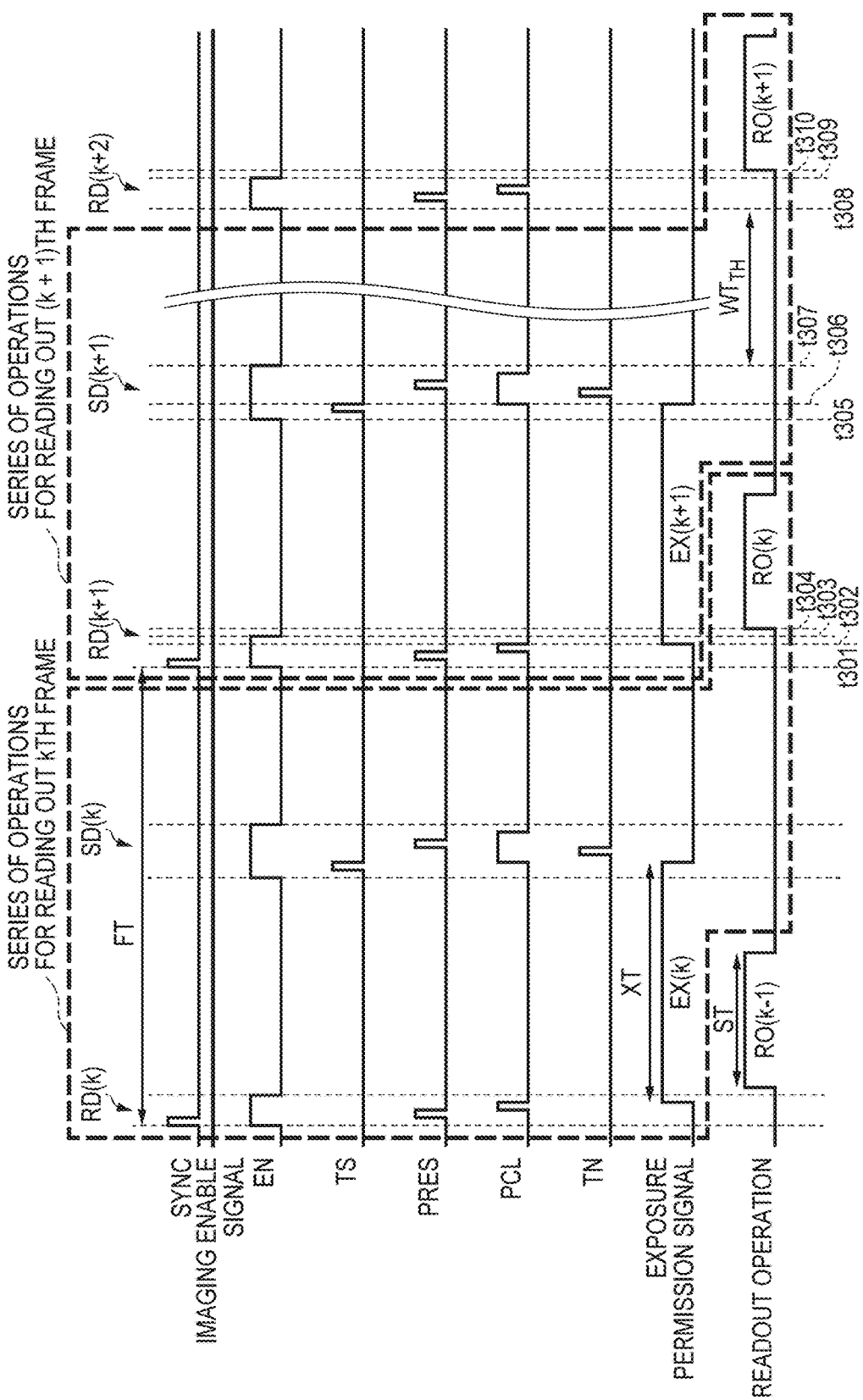
FIG. 12 is an example of a driving timing chart for a sensor in an operation mode of repeatedly performing radiation imaging.

An aspect of the operation of reading out the last frame in an operation mode of repeatedly performing radiation imaging will be exemplarily described with reference to FIGS. 11 to 13. FIGS. 11 to 13 each show an example of a driving timing chart for each sensor s when reading out the last frame. The ordinate in each of FIGS. 11 to 13 shows an imaging enable signal as well as the synchronization signal SYNC and the like shown in FIG. 8. The imaging enable signal is an enable signal for defining the start or end of radiation imaging such as continuous shooting or movie capturing, and is supplied from, for example, the unit 101 in FIG. 1. When the synchronization signal SYNC is received while the imaging enable signal is at H, one radiation imaging operation is performed.

FIG. 11 shows a case in which the imaging enable signal has changed from H to L after the reset driving RD(k+1) and before the sampling driving SD(k+1) at a portion, of the driving timing chart for each sensor s, where the (k+1)th frame as the last frame is read out.

More specifically, at time t201, the (k+1)th synchronization signal SYNC is received, and the reset driving RD(k+1) is performed in the interval between time t201 and time t203. In addition, at time t202 after at least the signal PCL is set at L, the exposure permission signal is set at H to start the irradiation EX(k+1). Thereafter, at time t204 after the end of at least the reset driving RD(k+1), the readout operation RO(k) is performed. With the readout operation RO(k), image data based on the signal sampled by the sampling driving SD(k), that is, the kth frame, is obtained.

Thereafter, at time t205, the imaging enable signal changes from H to L. In response to this, for example, the controlling unit 109 determines that the (k+1)th frame is the last frame.

Subsequently, in the interval between time t206 and time t208, the sampling driving SD(k+1) is performed. In addition, at time t207 before at least the signal PCL is set at H, the irradiation EX(k+1) is finished. With the sampling driving SD(k+1), a signal corresponding to the irradiation EX(k+1) is sampled in each sensor s.

In this case, at time t205, the imaging enable signal is set at L, and the radiation imaging is finished at the (k+1)th frame. For this reason, in the interval between time t209 and time t210, the (k+2)th reset driving RD(k+2) is performed without the reception of the next (k+2)th synchronization signal SYNC. Note that the interval between time t208 and time t209 may be set to a predetermined time based on preset conditions.

Subsequently, at time t211 after the end of at least the reset driving RD(k+2), the readout operation RO(k+1) is performed. With the readout operation RO(k+1), the image data based on the signal sampled by the sampling driving SD(k+1), that is, the (k+1)th frame as the last frame, is obtained.

According to the case shown in FIG. 11, the readout operation RO(k+1) for the (k+1)th frame as the last frame is performed under the same conditions as those for the readout operation RO for the preceding frames (that is, the first to kth frames). In other words, the dummy reset driving RD (k+2) is performed before the readout operation RO for the last frame. This makes it possible to obtain the last frame with the same quality as that of the preceding frames.

FIG. 12 shows, in the same manner as FIG. 11, a case in which a predetermined time has elapsed while the imaging enable signal is kept at H without the supply of the (k+2)th synchronization signal SYNC at a portion where the (k+1)th frame as the last frame is read out. According to the case shown in FIG. 12, when a predetermined time has elapsed without the supply of the (k+2)th synchronization signal SYNC, the readout operation RO(k+1) is performed to read out the (k+1)th frame as the last frame. As in the case shown in FIG. 11, before the readout operation RO(k+1), the dummy reset driving RD(k+2) is performed without the reception of the (k+2)th synchronization signal SYNC. This makes it possible to obtain even the last frame with the same quality as that of the preceding frames.

The operation in the interval between time t301 and time t304 is the same as that in the interval between time t201 and time t204 described above, and hence a description of it will be omitted. In addition, the operation in the interval between time t305 and time t307 is the same as that in the interval between time t206 and time t208 described above, and hence a description of it will be omitted.

Since the (k+2)th synchronization signal SYNC is not supplied even when a predetermined time (represented by "$WT_{TH}$" in FIG. 12) has elapsed after the end of the sampling driving SD(k+1) at time t307, the reset driving RD(k+2) is performed in the interval between time t308 and time t309. Subsequently, at time 310 after the end of at least the reset driving RD(k+2), the readout operation RO(k+1) is performed to read out the (k+1)th frame as the last frame.

According to the case shown in FIG. 12, when the predetermined time $WT_{TH}$ has elapsed while the imaging enable signal is kept at H without the supply of the (k+2)th synchronization signal SYNC, the (k+1)th frame is read out as the last frame. The predetermined time $WT_{TH}$ is set to a value that allows the (k+1)th frame to be properly read out by the readout operation RO(k+1), and can be set by the user as one of imaging conditions before the start of radiation imaging. According to the case shown in FIG. 12, it is possible to obtain the last frame with the same quality as that of the preceding frames as in the case shown in FIG. 11.

Note that in the case shown in FIG. 12, since the imaging enable signal is kept at H, radiation imaging can be continued. That is, when the predetermined time $WT_{TH}$ has elapsed without the supply of the (k+2)th synchronization signal SYNC, the radiation imaging may be finished after the (k+1)th frame is read out as the last frame or may be continued after the (k+1)th frame is read out. Assume that the radiation imaging is continued. In this case, the reset driving RD(k+2) is performed when the (k+2)th synchronization signal SYNC is received after the readout operation RO(k+1), and the sampling driving SD(k+2) or the like may be performed. Alternatively, the continued radiation imaging may be started as new radiation imaging.

FIG. 13 shows, in the same manner as FIGS. 11 and 12, a case in which after the sampling driving SD(k+1) is finished, the imaging enable signal is set at L before the lapse of the predetermined time $WT_{TH}$ (WT<$WT_{TH}$) in FIG. 13).

The operation in the interval between time t401 and time t404 is the same as that in the interval between time t201 and time t204 described above, and hence a description of it will be omitted. In addition, the operation in the interval between time t405 and time t407 is the same as that in the interval between time t206 and time t208 described above, and hence a description of it will be omitted.

At time t408 before the lapse of the predetermined time $WT_{TH}$ without the supply of the (k+2)th synchronization signal SYNC after the end of the sampling driving SD(k+1) at time t407, the imaging enable signal changes from H to L. In response to this, for example, the controlling unit 109 determines that the (k+1)th frame is the last frame.

Subsequently, in the interval between time t409 and time t410, the dummy reset driving RD(k+2) is performed without the reception of the (k+2)th synchronization signal SYNC. Note that the interval between time t407 and time t409 is set to a predetermined time based on preset conditions. Thereafter, at time t411 after the end of at least the reset driving RD(k+2), the readout operation RO(k+1) is performed to read out the (k+1)th frame as the last frame.

According to the case shown in FIG. 13, it is possible to obtain the last frame with the same quality as that of the preceding frames as in the cases shown in FIGS. 11 and 12.

As described above with reference to FIGS. 11 to 13, different driving methods can be used for each sensor s to read out the last frame depending on the timing when the last synchronization signal SYNC is received and the state of the imaging enable signal at that time.

(8. Example of Operation Flowchart for Radiation Imaging Apparatus)

FIG. 9 exemplarily shows an operation flowchart in an operation mode of repeatedly performing radiation imaging. In step S901 (to be simply referred to as "S901" hereinafter; the same applies to the other steps), imaging information such as imaging conditions is set. The imaging information can include an operation mode indicating whether to perform still image capturing or movie capturing, the time taken for one radiation irradiation operation or the dose of radiation for it, and parameters such as a frame rate when performing movie capturing. In addition, the imaging information can include parameters for directly specifying driving control on each unit of the apparatus IA and a method or timing for the driving control.

In S902, the validity of the imaging information set in S901 is determined. If the imaging information is valid, the process advances to S903. If the imaging information is not valid, for example, a wrong parameter is input, the process returns to S901.

In S903, an operation mode is determined based on the imaging information set in S901. The apparatus IA can have a plurality of operation modes such as a still image capturing mode, a movie capturing mode, and a continuous shooting mode. If, for example, the apparatus IA performs imaging in the movie capturing mode, the process advances to S904. If the apparatus IA performs imaging in the still image capturing mode, the process advances to S905.

In S904, the radiation imaging is finished after movie capturing described with reference to FIG. 8 is performed. In S905, the radiation imaging is finished after still image capturing described with reference to FIG. 7 is performed.

Obviously, although the two modes, namely the movie capturing mode and the still image capturing mode, have been exemplified in S903, these operation modes are not exhaustive, and another operation mode may be selected. For example, the apparatus IA has a plurality of movie capturing modes using different driving control methods (for example, different frame rates) for each unit. In this step, one of the plurality of movie capturing modes may be selected.

Figure 10A:
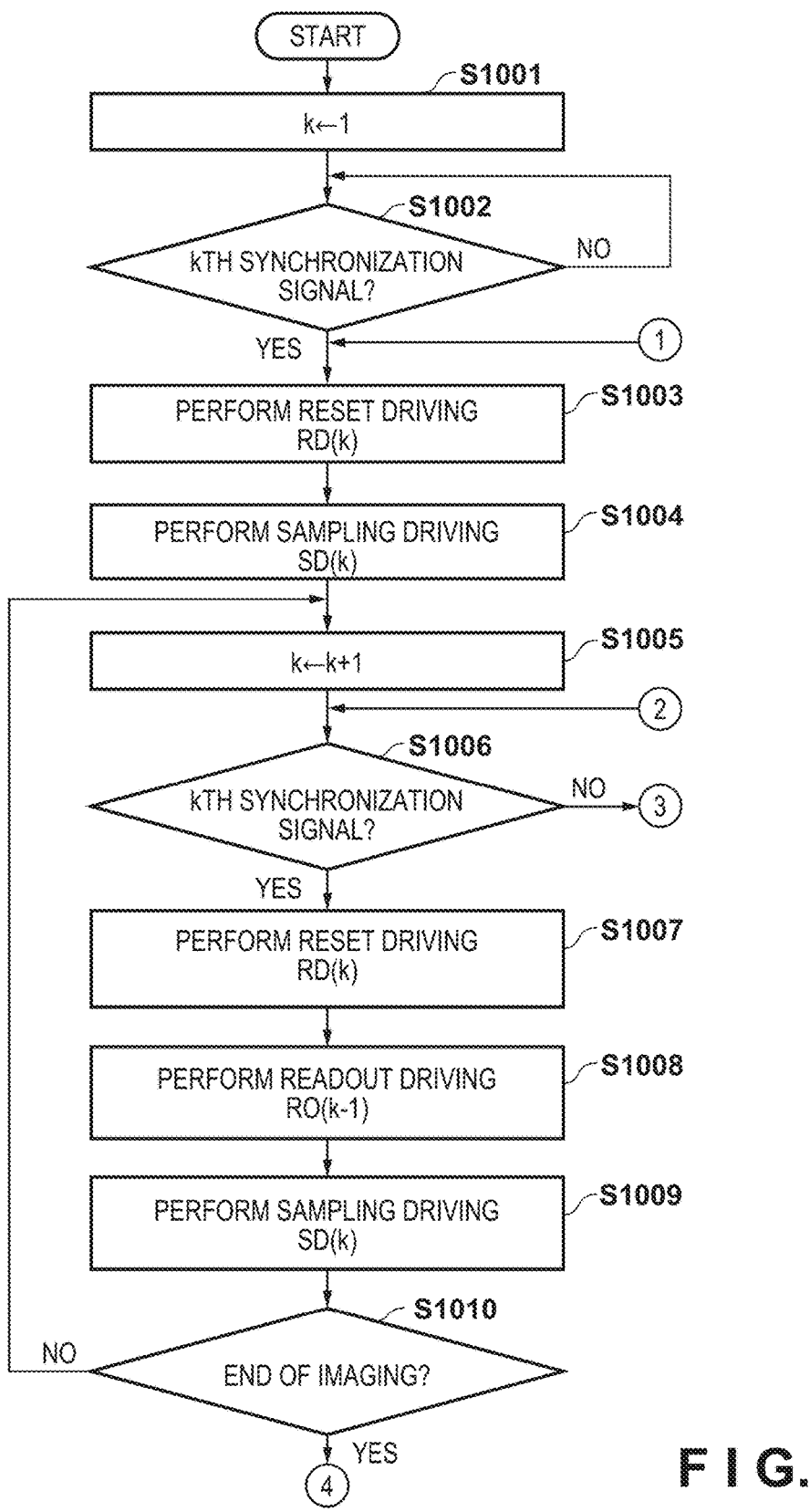
FIGS. 10A and 10B are an example of an operation flowchart for the radiation imaging apparatus.
Figure 10B:
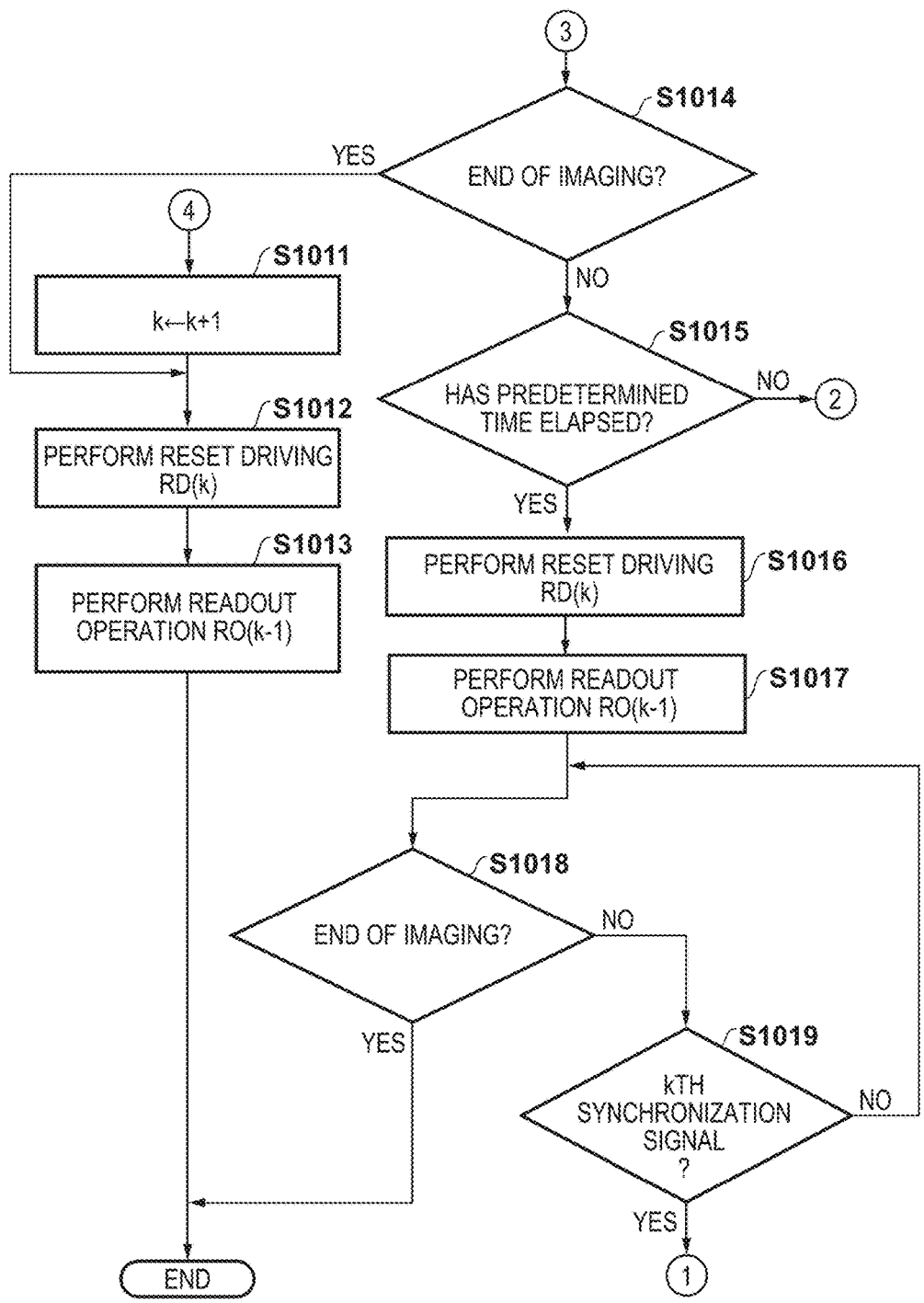

FIGS. 10A and 10B exemplarily show an operation flowchart for movie capturing (S904 in FIG. 9) described with reference to FIG. 8. In S1001, parameter k=1 is set. The process then advances to S1002. In S1002, it is determined whether the first synchronization signal SYNC is input. If the first synchronization signal SYNC is input, the process advances to S1003. If the synchronization signal SYNC is not input, the process returns to S1002 (a standby state is set until the signal is input).

Note that while the first synchronization signal SYNC is input, the reset driving RD may be repeatedly performed. If the first synchronization signal SYNC is not input even after the lapse of a predetermined period, this procedure may be forcibly terminated, and the apparatus IA may notify the user that movie capturing has not been properly performed or has not properly completed.

In S1003, the kth reset driving RD(k) is performed. In this case, since k=1 has been set in S1001, first reset driving RD(1) is performed. After the reset driving RD(1), first radiation irradiation EX(1) (not shown in FIGS. 10A and 10B) is started. Thereafter, the process stands by for a predetermined period or until the end of the irradiation, and then advances to S1004. While the process stands by, the photodiode PD of each sensor s generates charges corresponding to the dose of irradiated radiation.

In S1004, the kth sampling driving SD(k) is performed. In this case, since k=1 has been set in S1001, first sampling driving SD(1) is performed. With this operation, each sensor s samples a signal corresponding to the amount of charges generated in the photodiode PD. Thereafter, for example, the parameter k is incremented by one (that is, k=2 is set) in S1005, and the process advances to S1006.

In S1006, it is determined whether the kth synchronization signal SYNC has been input. More specifically, in this case, since k=2 has been set in S1005, it is determined whether the second synchronization signal SYNC has been input. If the second synchronization signal SYNC has been input, the process advances to S1007. If the synchronization signal SYNC has not been input, the process advances to S1014. The operation in S1014 will be described later.

In S1007, the kth reset driving RD(k) is performed. In this case, since k=2 has been set in S1005, second reset driving RD(2) is performed. After the reset driving RD(2), second radiation irradiation EX(2) (not shown in FIGS. 10A and 10B) is started. Thereafter, the process stands by for a predetermined period or until the end of the irradiation, and advances to S1008.

In S1008, the (k−1)th readout operation RO(k−1) is performed. In this case, since k=2 has been set in S1005, a first readout operation RO(1) is performed. With this operation, the signal sampled by the sampling driving SD(1) in S1004 is read out, and image data (first frame) is formed based on the readout signal. The unit 101 outputs the image data as a radiation image to the display unit 102.

The unit 101 may perform offset correction for the image data by using offset image data (which can also be called "dark image data") based on the signal output from each sensor s without radiation irradiation. As described above, charges are generated and accumulated owing to a dark current or the like in the photodiode PD of each sensor s even without radiation irradiation. Offset image data is formed based on a sensor signal corresponding to the charges. Performing offset correction for the image data obtained by the readout operation RO(1) will remove a noise component originating from a dark current or the like from the obtained image data. Note that offset image data may be obtained, for example, before S1001, and the apparatus IA, the unit 101, or another unit may include a holding unit or memory which temporarily holds the offset image data.

In S1009, the kth sampling driving SD(k) is performed. In this case, since k=2 has been set in S1005, second sampling driving SD(2) is performed. With this operation, each sensor s samples a signal corresponding to the amount of charges generated in the photodiode PD.

In S1010, it is determined whether the radiation imaging is finished. This determination may be performed by determining whether, for example, the value of k has reached a value based on the imaging information set in S901 or has reached a predetermined upper limit value. Alternatively, the determination of the end of imaging may be performed based on the above imaging enable signal and other control signals transmitted from the unit 101 to the controlling unit 109. If the movie capturing is finished, the process advances to S1011. Otherwise, the process returns to S1005.

Steps S1011 to S1013 correspond to the driving method shown in, for example, FIG. 11. In S1011, the value of k is incremented by one (for example, k=3 is set), and the process advances to S1012. In S1012, the kth reset driving RD(k) is performed. In this case, since k=3 has been set in S1011, third reset driving RD(3) is performed. After a predetermined time has elapsed, the process advances to S1013 without performing radiation irradiation.

In S1013, the kth readout operation RO(k−1) is performed. As described above, in this case, k=3 has been set in S1011, a second readout operation R0(2) is performed. With this operation, the signal sampled by the sampling driving SD(2) in S1009 is read out, and image data (second frame) is formed based on the readout signal. The unit 101 outputs this image data as a radiation image to the display unit 102.

In S1014, as in S1010, it is determined whether the movie capturing is finished. If the movie capturing is finished, the process advances to S1012. If the movie capturing is not finished, the process advances to S1015. Note that a procedure to be executed when the process advances to S1012 upon determination of the end of imaging in S1014 corresponds to the driving method shown in, for example, FIG. 13.

In S1015, it is determined whether a predetermined time has elapsed. If the predetermined time has elapsed, the process advances to S1016. If the predetermined time has not elapsed, the process returns to S1006. In this movie capturing, the second synchronization signal SYNC is assumed to be input. If, however, this synchronization signal SYNC is not input, the standby state is maintained for a long time. For this reason, if the second synchronization signal SYNC is not input even after the lapse of a predetermined time, the process advances to S1016. If it is determined in S1015 that the predetermined time has elapsed, the procedure to be executed corresponds to the driving method shown in, for example, FIG. 12.

In S1016, the kth reset driving RD(k) is performed. In this case, since k=2 has been set in S1005, the second reset driving RD(2) is performed. In S1017, the (k−1)th readout operation RO(k−1) is performed. In this case, since k=2 has been set in S1005, the first readout operation R0(1) is performed. With this operation, the signal sampled by the sampling driving SD(1) in S1004 is read out, and image data (first frame) is formed based on the readout signal. The unit 101 outputs the image data as a radiation image to the display unit 102.

In S1018, as in S1010 or S1014, it is determined whether this movie capturing is finished. If the movie capturing is finished, the procedure is terminated. If the movie capturing is not finished, the process advances to S1019. In S1019, it is determined whether the kth synchronization signal SYNC has been input. More specifically, in this case, since k=2 has been set in S1005, it is determined whether the second synchronization signal SYNC has been input. If the second synchronization signal SYNC has been input, the process returns to S1003. In this case, since second readout operation RO(k−1) has been performed in S1017, the readout operation (k−1) is not performed after the reset driving RD(k) in S1003. If the second synchronization signal SYNC has not input, the process returns to S1018.

Note that for the sake of easy explanation, the procedure up to k=3 has been described. The same applies to the procedure at and after k=4.

(9. Others)

In addition, the present invention is not limited to the above cases, and part of them may be changed in accordance with purposes and the like, or the respective features exemplarily described above may be combined. For example, the features described concerning the respective units, the respective steps, and other elements may be applied to other elements as needed. The above cases can be changed by those skilled in the art, as needed.

For example, the above cases each have exemplified the aspect in which the respective units of the apparatus IA are synchronously controlled by synchronization signals, and, for example, radiation irradiation is started after the reset driving RD is performed in response to the synchronization signal SYNC. That is, the apparatus IA can detect the start of radiation irradiation based on a synchronous signal, and performs the reset driving RD before the start of the irradiation. However, the present invention is not limited to the above cases. For example, various types of driving or operations including the reset driving RD may be performed based on the conditions set in advance by the user before radiation imaging. Alternatively, various types of driving or operations may be performed based on uniformly set conditions. That is, the present invention can be applied to an arrangement which is not necessary to perform synchronous control on each unit, for example, an arrangement configured to set, in advance, driving control on each unit and the timings of driving control and radiation irradiation.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-130683, filed Jun. 25, 2014, which is hereby incorporated by reference herein in its entirety.

What is claimed is:

1. A radiation imaging apparatus comprising a plurality of sensors and a driving unit configured to drive the plurality of sensors, each of the plurality of sensors including a detection element configured to detect radiation, a sampling unit configured to sample a signal from the detection element, and a reset unit configured to initialize the detection element,
wherein the driving unit performs:
a first reset operation of causing the reset units to initialize the detection elements;
a first sampling operation of causing the sampling units to sample a signal from the detection elements in accordance with first radiation irradiation started after the first reset operation;
a first output operation of outputting the signals sampled in the first sampling operation;
a second reset operation of causing the reset units to initialize the detection elements after the first sampling operation;
a second sampling operation of causing the sampling units to sample a signal from the detection elements in accordance with second irradiation started after the second reset operation following the first irradiation; and
a second output operation of outputting the signals sampled in the second sampling operation, and
wherein the driving unit is configured to operate in at least a mode in which the driving unit starts the first output operation after completion of the second reset operation and before the second sampling operation.

2. The apparatus according to claim 1, wherein the driving unit performs the first output operation in a time shorter than a time from the start of the second irradiation to the end of the second irradiation.

3. The apparatus according to claim 1, wherein the driving unit performs the first output operation after completion of the second reset operation and before the second sampling operation.

4. The apparatus according to claim 1, further comprising a radiation source configured to generate radiation and a control unit configured to control the driving unit and the radiation source,
wherein the control unit controls, upon receiving a control signal, to cause the driving unit to make the reset units initialize the detection elements, and controls the radiation source to generate radiation after the driving unit initializes the detection elements.

5. The apparatus according to claim 1, wherein the driving unit starts the second output operation in a case where irradiation next to the second irradiation is not started over a predetermined period after the second sampling operation.

6. The apparatus according to claim 1, further comprising a holding unit configured to hold image data based on signals output from the plurality of sensors while the plurality of sensors are not irradiated with radiation.

7. The apparatus according to claim 6, further comprising a processing unit,
wherein the processing unit forms first image data based on signals output by the first output operation and performs data processing for the first image data by using image data held by the holding unit, and forms second image data based on signals output by the second output operation and performing data processing for the second image data by using image data held by the holding unit.

8. The apparatus according to claim 1, wherein the driving unit includes, as operation modes, a first mode of starting the first output operation after completion of the second reset operation and a second mode of starting the second reset operation after completion of the first output operation, and
the radiation imaging apparatus further comprises
an information input unit configured to allow a user to input imaging information, and
a mode set unit configured to set the driving unit in one of the first mode and the second mode based on the input imaging information.

9. The apparatus according to claim 8, wherein the mode setting unit
obtains, based on the input imaging information, a time from the start of the first irradiation to the start of the second irradiation, a time taken for the second irradiation, and a time required for the driving unit to perform the first output operation, and
sets the driving unit in the first mode in a case where the time from the start of the first irradiation to the start of the second irradiation is shorter than a sum of the time taken for the second irradiation and the time required for the driving unit to perform the first output operation.

10. A driving method for a radiation imaging apparatus including a plurality of sensors, each of the plurality of sensors including a detection element configured to detect radiation, a sampling unit configured to sample a signal from the detection element, and a reset unit configured to initialize the detection element, the method comprising:
performing a first reset operation of causing the reset units to initialize the detection elements before the start of first radiation irradiation onto the plurality of sensors;
performing a first sampling operation of causing the sampling units to sample signals from the detection elements in accordance with the first irradiation;
performing a first output operation of outputting the signals sampled in the performing the first sampling operation;
performing a second reset operation of causing the reset units to initialize the detection elements before the start of second irradiation next to the first irradiation;
performing a second sampling operation of causing the sampling units to sample signals from the detection elements in accordance with the second irradiation; and
performing a second output operation of outputting the signals sampled in the performing the second sampling operation,
wherein the performing the first output operation is started after completion of the second reset operation and before the second sampling operation.

11. A non-transitory computer-readable medium storing a computer-executable program for causing a computer to perform the method according to claim 10.

12. The apparatus according to claim 1, wherein
the detection element is one of a plurality of detection elements corresponding to the plurality of sensors, respectively,
the sampling unit is one of a plurality of sampling units corresponding to the plurality of sensors, respectively, and
the reset unit is one of a plurality of reset units corresponding to the plurality of sensors, respectively, and wherein
in the first reset operation, the plurality of detection elements are collectively initialized by the plurality of reset units,
in the first sampling operation, signals from the plurality of detection elements in accordance with the first radiation irradiation are collectively sampled by the plurality of sampling units,
in the first output operation, the signals sampled in the first sampling operation are sequentially output from the plurality of sensors,
in the second reset operation, the plurality of detection elements are collectively initialized by the plurality of reset units, after the first sampling operation,
in the second sampling operation, signals from the plurality of detection elements in accordance with the second radiation irradiation are collectively sampled by the plurality of sampling units, and
in the second output operation, the signals sampled in the second sampling operation are sequentially output from the plurality of sensors.

13. A radiation imaging apparatus comprising a plurality of sensors and a driving unit configured to drive the plurality of sensors, the plurality of sensors, respectively, including a plurality of detection elements each configured to detect radiation, a plurality of sampling units each configured to sample a signal from the respective detection element, and a plurality of reset units each configured to initialize the respective detection element, wherein the driving unit performs:
a first reset operation of causing the plurality of reset units to collectively initialize the plurality of detection elements;
a first sampling operation of causing the plurality of sampling units to collectively sample signals from the plurality of detection elements in accordance with first radiation irradiation started after the first reset operation;
a first output operation of outputting the signals sampled in the first sampling operation, sequentially;
a second reset operation of causing the plurality of reset units to collectively initialize the plurality of detection elements after the first sampling operation;
a second sampling operation of causing the plurality of sampling units to collectively sample signals from the plurality of detection elements in accordance with second irradiation started after the second reset operation following the first irradiation; and
a second output operation of outputting the signals sampled in the second sampling operation, sequentially, and
wherein the driving unit is configured to operate in at least a mode in which the driving unit starts the first output operation after completion of the second reset operation and before the second sampling operation.

* * * * *